(12) United States Patent
Tanaka et al.

(10) Patent No.: US 7,980,772 B2
(45) Date of Patent: Jul. 19, 2011

(54) SHUTTER DEVICE AND IMAGE PICKUP APPARATUS

(75) Inventors: Yoshiharu Tanaka, Osaka (JP);
Nobuharu Murashima, Nara (JP)

(73) Assignee: Sony Corporation, Tokyo (JP)

( * ) Notice: Subject to any disclaimer, the term of this patent is extended or adjusted under 35 U.S.C. 154(b) by 163 days.

(21) Appl. No.: 12/457,313

(22) Filed: Jun. 8, 2009

(65) Prior Publication Data

US 2010/0027987 A1   Feb. 4, 2010

(30) Foreign Application Priority Data

Jul. 29, 2008 (JP) ................................. 2008-194454

(51) Int. Cl.
*G03B 9/00* (2006.01)
(52) U.S. Cl. .................... 396/443; 396/401; 396/480
(58) Field of Classification Search .................. 396/401, 396/443, 480
See application file for complete search history.

(56) References Cited

U.S. PATENT DOCUMENTS 6,071,019 A * 6/2000 Shimada ...................... 396/456

FOREIGN PATENT DOCUMENTS

| JP | 11-095282 | 4/1999 |
| JP | 2000-050137 A | 2/2000 |
| JP | 2001-215555 | 8/2001 |
| JP | 2003-015190 A | 1/2003 |
| JP | 2006-098908 A | 4/2006 |
| JP | 2006-098909 A | 4/2006 |
| JP | 2008-011358 A | 1/2008 |

OTHER PUBLICATIONS

Translation of JP Publication No. 2001-021944; Inventor: Kiyota et al.; Title: Double Light Shielding System Focal Plane Shutter for Camera; Publication Date: Jan. 26, 2001.*
Japanese Office Action issued Aug. 10, 2010 for corresponding Japanese Application No. 2008-194454.

* cited by examiner

*Primary Examiner* — W.B. Perkey
*Assistant Examiner* — Fang-Chi Chang
(74) *Attorney, Agent, or Firm* — Rader, Fishman & Grauer PLLC

(57) ABSTRACT

Disclosed herein is an image pickup apparatus including: an image sensor; and a shutter device, wherein said shutter device includes a trailing curtain, a first driving member, a second driving member, first urging force applying means, and a charging member.

15 Claims, 17 Drawing Sheets

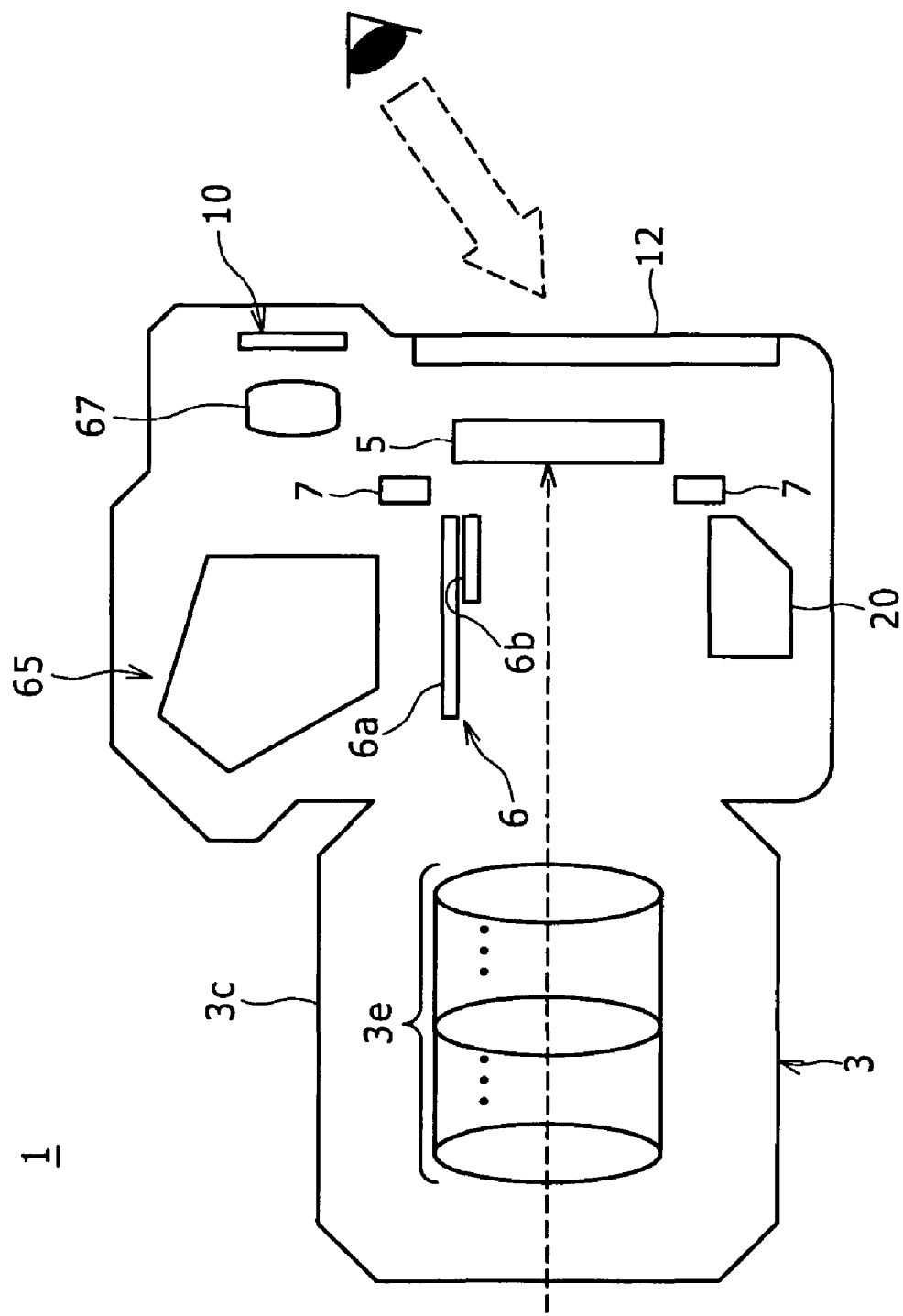
F I G . 5

DIRECTION OF URGING FORCE APPLIED BY SPRING 88

DIRECTION OF URGING FORCE APPLIED BY SPRING 89

SHUTTER DEVICE AND IMAGE PICKUP APPARATUS

BACKGROUND OF THE INVENTION

1. Field of the Invention

The present invention relates to a shutter device and an image pickup apparatus (image sensing apparatus) using the shutter device.

2. Description of the Related Art

As a shutter device for use in image pickup apparatuses, there is a shutter device in which a group of leading blades and a group of trailing blades are sequentially moved in the same direction, and an exposure operation is performed by use of a slit formed between the two blade groups. In this shutter device, the leading blades, an arm member rotationally connected to the leading blades, and a leading blade driving member for driving the arm member are provided, and the leading blades are driven. Besides, similarly, the trailing blades, an arm member rotationally connected to the trailing blades, and a trailing blade driving member for driving the arm member are provided, and the trailing blades are driven. Incidentally, in the following, operations of the trailing blades will be described mainly.

For example, in a shutter device described in Japanese Patent Laid-open No. 2001-215555 (this shutter device will be referred to also as "the first related art"), when a predetermined setting (cocking) member (referred to also as charging member) is driven by a predetermined driving section, a trailing blade driving member is rotated according to this driving operation. The trailing blade driving member is connected with a spring in the state of being urged in a predetermined direction (a spring charged with elastic energy). The spring is such a spring that the urging force in the predetermined direction can be increased (referred to also as "overcharged") by deforming it in a certain direction. Specifically, the spring is overcharged when the predetermined setting member is rotationally moved in a predetermined direction.

In addition, with the trailing blade driving member attracted by an electromagnet, after the overcharging, the rotational movement of the trailing blade driving member is restrained. Further, when restraint on the urging force is released by stopping the energization of the electromagnet after the setting member is returned into its original position (after retraction), the trailing blade driving member is driven at high speed by the urging force of the spring. Since the trailing blade driving member is connected with the trailing blades (trailing curtain of shutter) through the arm member, the trailing blades are each moved at high speed from an opening position for a shutter aperture to a closing position for the shutter aperture, according to the driving of the trailing blade driving member. Thus, the trailing blade driving member is turned by the urging force of the spring having been overcharged, and a closing operation of the trailing blades (trailing shutter curtain) is performed according to the turning motion of the trailing blade driving member.

In the shutter device according to the first related art, the spring is overcharged when the trailing blade driving member is turned in a certain direction by the movement of the setting member from a position to another position. In addition, when the trailing blade driving member is turned in the just-mentioned direction (the same direction), the trailing blades are each moved to the opening position for the shutter aperture. In other words, attendant on the turning motion of the trailing blade driving member, an overcharging operation and an opening operation of the trailing blades are carried out simultaneously. Therefore, when the spring is in the overcharged state, the trailing blades are each necessarily present in the opening position, and the trailing blades cannot each be present in the closing position for the shutter aperture when the spring is in the overcharged state.

On the other hand, there is a shutter device different in configuration from the first related art. For example, in a shutter device described in Japanese Patent Laid-open No. Hei 11-95282 (this shutter device will be referred to also as "the second related art"), a driving system for a group of trailing blades includes a trailing blade operating member in addition to a trailing blade driving member.

The trailing blade driving member is connected to an overcharging spring, while the trailing blade operating member is connected to each of the trailing blades through an arm member. In addition, after a setting member rotates the trailing blade driving member to a predetermined position so as to overcharge the spring, the setting member mechanically supports the trailing blade driving member.

Besides, the trailing blade operating member, which is turned coaxially with the trailing blade driving member, can be turned independently of the trailing blade driving member. Specifically, when the trailing blade driving member is turned for an overcharging operation, the trailing blade operating member makes contact with a part of the setting member, whereby the trailing blade operating member is inhibited from rotating. As a result, only the trailing blade driving member is rotated, and the trailing blade operating member is not rotated. Therefore, trailing blades connected to the trailing blade operating member can each continue to be present at the closing position for the shutter aperture. Thus, according to the second related art, the spring can be overcharged while keeping each of the trailing blades in the closing position for the shutter aperture. Besides, in the overcharged state of the spring, mechanical support of the trailing blade driving member by the setting member can also be realized.

Thereafter, energization of an electromagnet is started and attractive holding of the trailing blade driving member by the electromagnet is started, after which the setting member is moved so as to release the contact between the setting member and the trailing blade operating member. In response to this releasing operation, the trailing blade operating member is rotated, whereby the trailing blades are each moved into the opening position for the shutter aperture. In this manner, the trailing blades can each be moved to the opening position for the shutter aperture while maintaining the overcharged state of the spring. It is to be noted here, however, that in this condition, the setting member does not mechanically support the trailing blade driving member.

SUMMARY OF THE INVENTION

Meanwhile, image pickup apparatuses capable of live-view shooting (live-view photographing) include those which can be switched between a live view mode using an electronic viewfinder (EVF) and an OVF mode using an optical finder (OVF) based on an observation optical system.

In such an image pickup apparatus, for example, a shutter curtain is opened in the live view mode on one hand, and the shutter curtain is closed in the OVF mode on the other hand.

In addition, in recent years, there have been image pickup apparatuses in which the function of the leading curtain, of a leading curtain and a trailing curtain in a shutter device, is replaced by an electronic operation (for example, line-by-line sequential resetting operations at an image sensor).

Now, a case is supposed in which only the trailing curtain in the shutter device according to the first related art is used for the just-mentioned image pickup apparatus. In this case, the trailing blade driving member and the trailing blades are operated integrally. Therefore, if it is attempted to overcharge the spring by turning the trailing blade driving member in a certain direction, the trailing blades are each also moved to the opening position for the shutter aperture according to the turning motion of the spring. Accordingly, the shutter curtain (the trailing curtain) cannot be kept closed in the overcharged state of the spring.

Therefore, it is impossible, for example, to perform the overcharging operation while keeping the shutter curtain closed at the time of framing by use of an optical finder. Or, it is impossible, as will be described later, to perform an overcharging operation concurrently with reading of pixel information from an image sensor 5 while keeping the shutter curtain closed immediately after completion of exposure at the image sensor 5.

On the other hand, when only the trailing curtain in the shutter device according to the second related art is used for such an image pickup apparatus, it is possible to realize both closure of the shutter curtain (trailing curtain) in the overcharged state of the spring and opening of the shutter curtain (trailing curtain) in the overcharged state of the spring.

It is to be noted here, however, that when the second related art is utilized, the setting member does not mechanically support the trailing blade driving member in the condition where the trailing blades are each present in the opening position for the shutter aperture. In other words, it is impossible to maintain each of the trailing blade in the opening position for the shutter aperture by a mechanical supporting force. Therefore, for maintaining the just-mentioned condition, it is necessary to continue energization of the electromagnet. That is, the trailing blades can each be maintained in the opening position for the shutter aperture, only by energizing the electromagnet to attractingly hold the trailing blade driving member by a magnetic force.

Therefore, for example when the second related art is utilized for an image pickup apparatus having a live view mode, it is necessary to keep the trailing curtain in the open state by energizing the electromagnet after the spring is put into the overcharged state and the trailing curtain is opened, in the live view mode. However, to continue the energization of the electromagnet in the period for which the shutter curtain (trailing curtain) is open in the live view mode is not desirable from the viewpoint of electric power saving.

Thus, there is a need for a shutter device which promises power saving in realizing both a condition where a spring is overcharged and a trailing curtain is present in an opening position for a shutter aperture and a condition where the spring is overcharged and the trailing curtain is present in a closing position for the shutter aperture, and a technology pertaining to the shutter device.

According to an embodiment of the present invention, there are provided a shutter device and an image pickup apparatus using the shutter device, the shutter device including: a trailing curtain operative to run from an exposure start position to an exposure end position to cover an exposure aperture; a first driving member operative to cause the trailing curtain to run from the exposure start position to the exposure end position; a second driving member operative to cause the trailing curtain to run from the exposure end position to the exposure start position; first urging force applying means by which a first urging force for moving the trailing curtain in a first direction from the exposure start position toward the exposure end position is applied to the first driving member; and a charging member which moves the first driving member in a predetermined direction so as to overcharge the first urging force applying means and thereby to increase the first urging force. In the shutter device, the charging member moves the first driving member in the predetermined direction while restraining movement of the second driving member, so as to overcharge the first urging force applying means while maintaining a closed state of the aperture formed by the trailing curtain and thereby to transfer the shutter device into a first set condition, and, in the first set condition, makes contact with the first driving member to restrain movement of the first driving member; and the charging member, in the closed state of the aperture formed by the trailing curtain, releases the restraint-on movement of the second driving member to permit the second driving member to move, while moving the first driving member in the predetermined direction, so as to form an open state of the aperture by the trailing curtain while overcharging the first urging force applying means and thereby to transfer the shutter device into a second set condition, and, in the second set condition, makes contact with the first driving member to restrain movement of the first driving member.

According to another embodiment of the present invention, there are provided a shutter device and an image pickup apparatus using the shutter device, the shutter device including: a trailing curtain operative to run from an exposure start position to an exposure end position to cover an exposure aperture; a first driving member to which a first urging force is applied by first urging force applying means and which causes the trailing curtain to run from the exposure start position to the exposure end position by the first urging force; a second driving member which, on one hand, moves together with the first driving member so as to cause the trailing curtain to run from the exposure start position to the exposure end position and, on the other hand, moves independently of the first driving member so as to cause the trailing curtain to run from the exposure end position to the exposure start position; and a charging member which moves the first driving member in a predetermined direction so as to overcharge the first urging force applying means and thereby to increase the first urging force. In the shutter device, the charging member moves the first driving member in the predetermined direction while restraining movement of the second driving member, so as to overcharge the first urging force applying means while maintaining a closed state of the aperture formed by the trailing curtain and thereby to transfer the shutter device into a first set condition, and, in the first set condition, makes contact with the first driving member to restrain movement of the first driving member; and the charging member, after transfer to the first set condition, releases the restraint on movement of the second driving member to permit the second driving member to move, maintains an overcharged state of the first urging force applying means, while forming an open state of the aperture by the trailing curtain, so as to transfer the shutter device into a second set condition, and, in the second set condition, makes contact with the first driving member to restrain movement of the first driving member.

According to a further embodiment of the present invention, there are provided a shutter device and an image pickup apparatus using the shutter device, the shutter device including: a trailing curtain operative to run from an exposure start position to an exposure end position to cover an exposure aperture; a first driving member to which a first urging force is applied by first urging force applying means and which causes the trailing curtain to run from the exposure start position to the exposure end position by the first urging force; a second driving member which, on one hand, moves together with the first driving member so as to cause the trailing curtain to run from the exposure start position to the exposure end position and, on the other hand, moves independently of the first driving member so as to cause the trailing curtain to run from the exposure end position to the exposure start position; and a charging member which moves the first driving member in a predetermined direction so as to overcharge the first urging force applying means and thereby to increase the first urging force. In the shutter device, the charging member moves the first driving member in the predetermined direction while restraining movement of the second driving member, so as to overcharge the first urging force applying means while maintaining a closed state of the aperture formed by the trailing curtain and thereby to transfer the shutter device into a first set condition; and the charging member, after transfer to the first set condition, releases the restraint on movement of the second driving member to permit the second driving member to move, maintains an overcharged state of the first urging force applying means, while forming an open state of the aperture by the trailing curtain, so as to transfer the shutter device into a second set condition, and, in the second set condition, makes contact with the first driving member to restrain movement of the first driving member.

According to the just-mentioned embodiments of the present invention, both a condition where the spring is overcharged and the trailing curtain is present in the opening position for the exposure aperture and a condition where the spring is overcharged and the trailing curtain is present in the closing position for the exposure aperture can be realized without energization of an electromagnet. This promises savings of electric power.

BRIEF DESCRIPTION OF THE DRAWINGS

FIG. 5 is a sectional view of the image pickup apparatus (mirror-up condition);

DETAILED DESCRIPTION OF THE PREFERRED EMBODIMENTS

Now, embodiments of the present invention will be described below, based on the attached drawings.

<1. Outline of Configuration>

Figure 1:
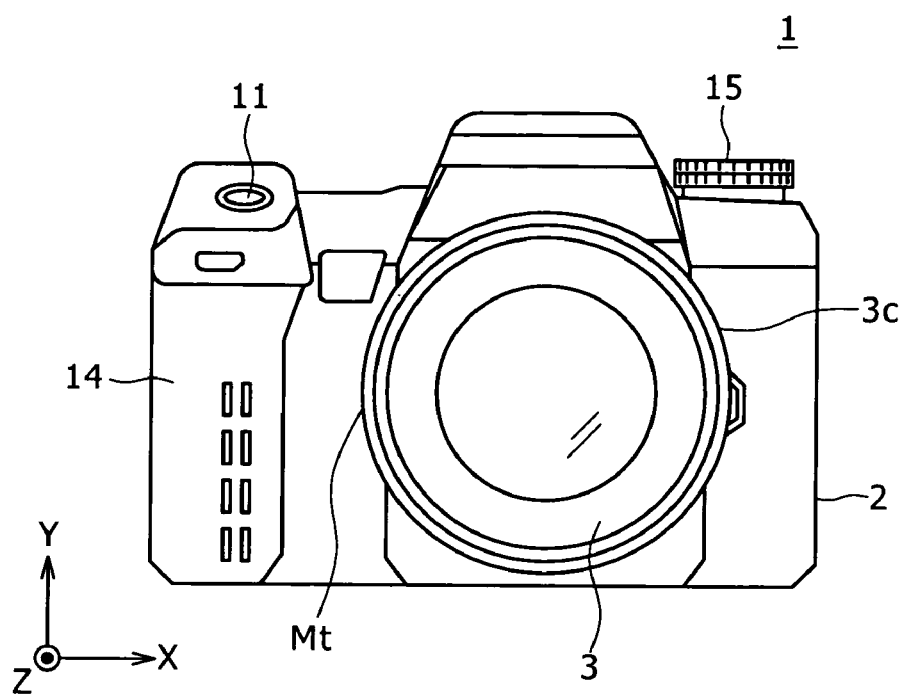
FIG. 1 is a front appearance view of an image pickup apparatus.
Figure 2:
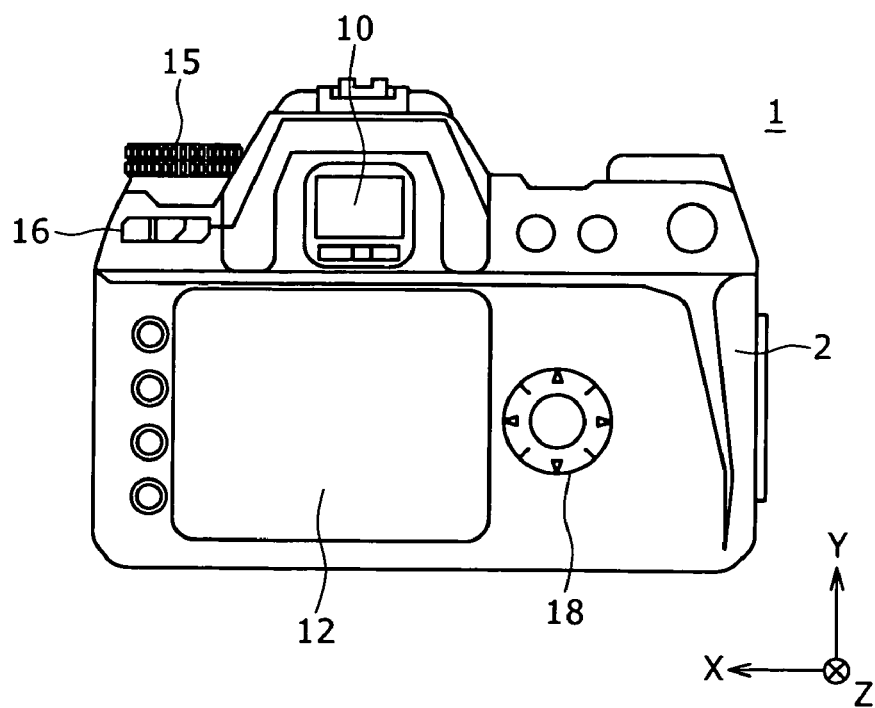
FIG. 2 is a rear appearance view of the image pickup apparatus.

FIGS. 1 and 2 are views showing appearance configurations of an image pickup apparatus 1 according to an embodiment of the present invention. Here, FIG. 1 is a front appearance view of the image pickup apparatus 1, and FIG. 2 is a rear appearance view of the image pickup apparatus 1. The image pickup apparatus 1 is configured as a lens-interchangeable single reflex type digital camera.

As shown in FIG. 1, the image pickup apparatus 1 has a camera body 2. An interchangeable photographing lens unit (interchangeable lens) 3 can be mounted to and dismounted from the camera body 2.

The photographing lens unit 3 is composed mainly of a lens barrel 3c, a lens group 3e (see FIG. 3) provided inside the lens barrel 3c, and a diaphragm and the like. The lens group 3e (photographing optical system) includes a focus lens which is moved in an optical axis direction to vary the focal point position and the like.

The camera body 2 is provided, in a substantially central area of a front surface thereof, with an annular mount part Mt to which the photographing lens unit 3 is mounted.

In addition, the camera body 2 is provided with a mode setting dial 15 in a right upper area of the front surface thereof. By operating the mode setting dial 15, it is possible to set (switch) various modes of camera (inclusive of "shooting mode" for obtaining a real shot image(s), "reproduction mode" for reproducing the shot image(s), and "communication mode" for data communication with external apparatuses).

Besides, the camera body 2 is provided, in a left end area of the front surface thereof, with a grip part 14 to be gripped by the user. A release button 11 for instructing the start of exposure is provided at an upper surface of the grip part 14. A battery compartment and a card compartment are provided inside the grip part 14. A battery such as a lithium ion battery is contained in the battery compartment as a power source for the camera, and a memory card 90 (see FIG. 3) for recording image data of shot images is removably contained in the card compartment.

The release button 11 is a two-stage detection button capable of detection of two states, i.e., a half-depressed state (S1 state) and a full-depressed state (S2 state). When the release button 11 is half pressed into the S1 state, a preparatory operation (e.g., an AF (auto focus) control operation, etc.) for obtaining a recording still image (real shot image) relevant to a subject is carried out. In addition, when the release button 11 is further pressed into the S2 state, a shooting (photographing) operation for obtaining the real shot image is carried out Specifically, an exposure operation relating to a subject image (a light image of the subject) is performed using an image sensor 5 (described later), and a series of operations for subjecting an image signal obtained by the exposure operation to predetermined image processings are carried out. Thus, the image pickup apparatus 1 determines that a shooting preparation command is inputted when the release button 11 is put into the half-depressed state S1, and determines that a shooting command is inputted when the release button 11 is put into the full-depressed state S2.

In FIG. 2, a finder window (ocular window) 10 is provided in a substantially upper central area of the back surface of the camera body 2. By peeping into the finder window 10, the user can visually check the light image of the subject led through the photographing lens unit 3, thereby framing (deciding a composition). Thus, framing can be performed using an optical finder.

In FIG. 2, a back monitor 12 is provided in a substantially central area of the back surface of the camera body 2. The back monitor 12 is configured as a color liquid crystal display (LCD), for example.

On the back monitor 12, a menu screen for setting shooting conditions and the like can be displayed, and a shot image or images recorded in a memory card 90 can be reproducedly displayed in the reproduction mode.

In addition, on the back monitor 12, a plurality of time-series images (i.e., motion picture images) obtained by the image sensor 5 (described later) can be sequentially displayed as live-view images. In the image pickup apparatus 1 according to this embodiment, framing can be conducted using the live-view images displayed on the back monitor 12.

A power switch (main switch) 16 is provided on the left upper side of the back monitor 12. The power switch 16 is a two-contact-position slide switch; when the contact is set to an "OFF" position on the left side, a power source is turned OFF, and when the contact is set to an "ON" position on the-right side, the power source is turned ON.

A direction selector key 18 is provided on the right side of the back monitor 12. The direction selector key 18 has a circular operating button. In the operating button, a pressing operation in any of four directions composed of upward, downward, leftward and rightward directions or a pressing operation in any of four directions composed of upwardly rightward, upwardly leftward, downwardly rightward and downwardly leftward directions is detected individually. Incidentally, in the direction selector key 18, a pressing operation on a central pushbutton is detected, separately from the pressing operation in any of the just-mentioned eight directions.

<2. Functional Blocks of Image Pickup Apparatus>

Figure 3:
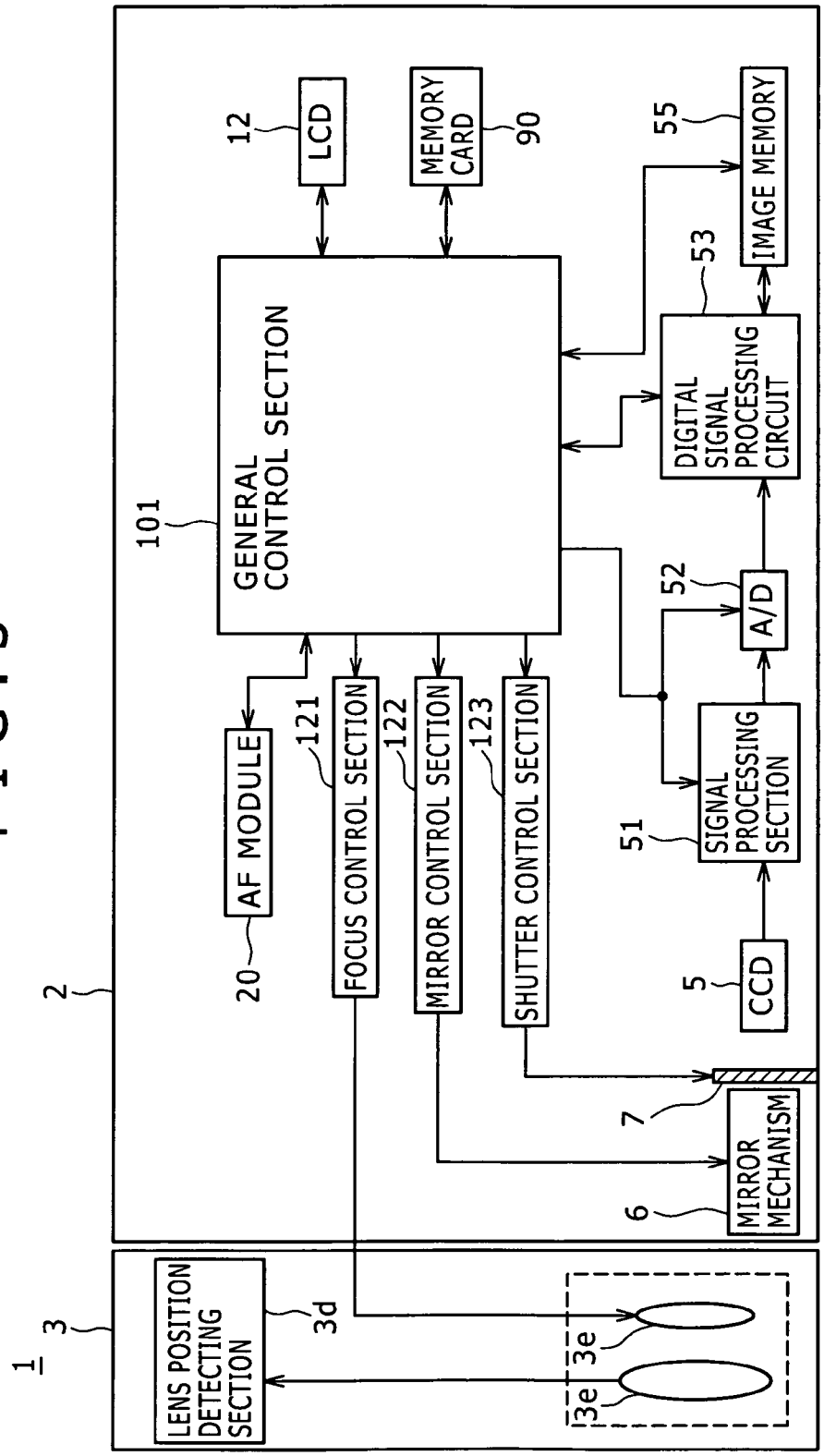
FIG. 3 is a block diagram showing the functional configuration of the image pickup apparatus.

Now, referring to FIG. 3, an outline of functions of the image pickup apparatus 1 will be described below. FIG. 3 is a block diagram showing the functional configuration of the image pickup apparatus 1.

As shown in FIG. 3, the image pickup apparatus 1 has an AF module 20, a general control section 101, a focus control section 121, a mirror control section 122, a shutter control section 123, a digital signal processing circuit 53, etc.

The general control section 101, in cooperation with the AF module 20 and the focus control section 121 and the like, performs a focus control operation for controlling the position of the focus lens.

The general control section 101 is configured as a microcomputer, and mainly has a CPU (central processing unit), a memory, and ROM (read only memory) (for example, EEPROM (electrically erasable and programmable read only memory)), etc. The general control section 101 reads programs stored in the ROM, and executes the programs, thereby realizing various functions.

The AF module 20 is capable of detecting a focused state of a subject by a focused state detecting technique based on a phase difference system, using the light coming in thereto through a mirror mechanism 6. According to the focused state of the subject detected by the AF module 20, the general control section 101 realizes an AF operation by use of the focus control section 121. Particularly, by use of the AF module 20 of the phase difference system, a focusing lens position can be obtained at a very high speed.

The focus control section 121 realizes a focus control operation by cooperation with the general control section 101. Specifically, the focus control section 121 produces a control signal on the basis of a signal inputted thereto from the general control section 101, and moves the focus lens included in the lens group 3e disposed in the photographing lens unit 3. In addition, the position of the focus lens is detected by a lens position detecting section 3d in the photographing lens unit 3, and data indicative of the position of the focus lens is sent to the general control section 101. In this manner, the focus control section 121 controls movements of the focus lens in the optical axis direction, etc.

Besides, the mirror control section 122 controls switching between a condition where the mirror mechanism 6 is retracted from the optical path (mirror-up condition) and a condition where the mirror mechanism 6 is shutting off the optical path (mirror-down condition). The mirror control section 122 produces a control signal on the basis of a signal inputted thereto from the general control section 101, thereby switching between the mirror-up condition and the mirror-down condition.

The shutter control section 123 produces a control signal on the basis of a signal inputted thereto from the general control section 101, thereby controlling the operation of a shutter device 7.

The shutter device 7 is disposed at a position on the subject side of, and close to, the image sensor 5. The shutter device 7 is a so-called focal plane shutter. The shutter device 7 is arranged to be substantially perpendicular to the optical axis of the photographing lens unit 3. Specifically, the shutter device 7 is so arranged that the center position of its aperture. (opening) OP (described later) lies on the optical axis of the photographing lens unit 3.

In addition, on the back side of the shutter device 7, the image sensor 5 is arranged to be substantially perpendicular to the optical axis of the photographing lens unit 3.

The image sensor (here, a CMOS sensor) 5 is a light receiving element by which a light image of subject (subject image) coming from the photographing lens unit 3 is converted into an electrical signal by a photo-electric conversion action, and produces (obtains) an image signal relevant to a real shot image (an image signal for recording). Besides, the image sensor 5 obtains live-view images, too.

In response to drive control signals (an accumulation start signal and an accumulation end signal) from the general control section 101, the image sensor 5 performs exposure to a subject image formed on an image forming plane (accumulation of electric charges through photo-electric conversion), so as to produce an image signal relevant to the subject image. In addition, the image sensor 5 outputs the image signal to a signal processing section 51, in response to a reading control signal supplied from the general control section 101.

When the image signal obtained at the image sensor 5 is subjected to a predetermined analog signal processing by the signal processing section 51, the image signal obtained upon the analog signal processing is converted into digital image data (image data) by an A/D (analog/digital) conversion circuit 52. The image data is inputted to the digital signal processing circuit 53.

In the digital signal processing circuit 53, the image data inputted from the A/D conversion circuit 52 is subjected to digital signal processing, to produce image data relevant to a shot image. The digital signal processing circuit 53 includes a black level correction circuit, a white balance (WB) circuit, a γ correction circuit, etc., and performs various digital image processing. Incidentally, an image signal (image data) obtained upon processings by the digital signal processing circuit 53 is stored into an image memory 55. The image memory 55 is a high-speed accessible image memory for temporarily storing the image data thus produced, and has a capacity sufficient to store the image data in an amount corresponding to a plurality of frames.

At the time of real shooting, the image data temporarily stored in the image memory 55 is subjected to appropriate image processings (compression, etc.) in the general control section 101, before being stored into the memory card 90.

In addition, at the time of live view, time-series images (live-view images) obtained by the image sensor 5 and temporarily stored in the image memory 55 are sequentially displayed on the back monitor 12.

<3. Outline of Shooting Operation>

As has been mentioned above, in the image pickup apparatus 1, framing (deciding a composition) can be performed using the optical finder (referred to also as optical viewfinder (OVF)) composed of a finder optical system or the like.

Besides, in the image pickup apparatus 1, framing can also be performed using live-view images displayed on the back monitor 12. Incidentally, the finder function realized by utilizing the back monitor 12 includes a process in which the light image of a subject is converted into electronic data and thereafter the electronic data is visualized, and, therefore, this finder function is referred to also as electronic viewfinder (EVF).

The OVF-based framing mode (OVF mode) and the EVF-based framing mode (EVF mode) are changed over by an appropriate changeover switch (not shown).

Figure 4:
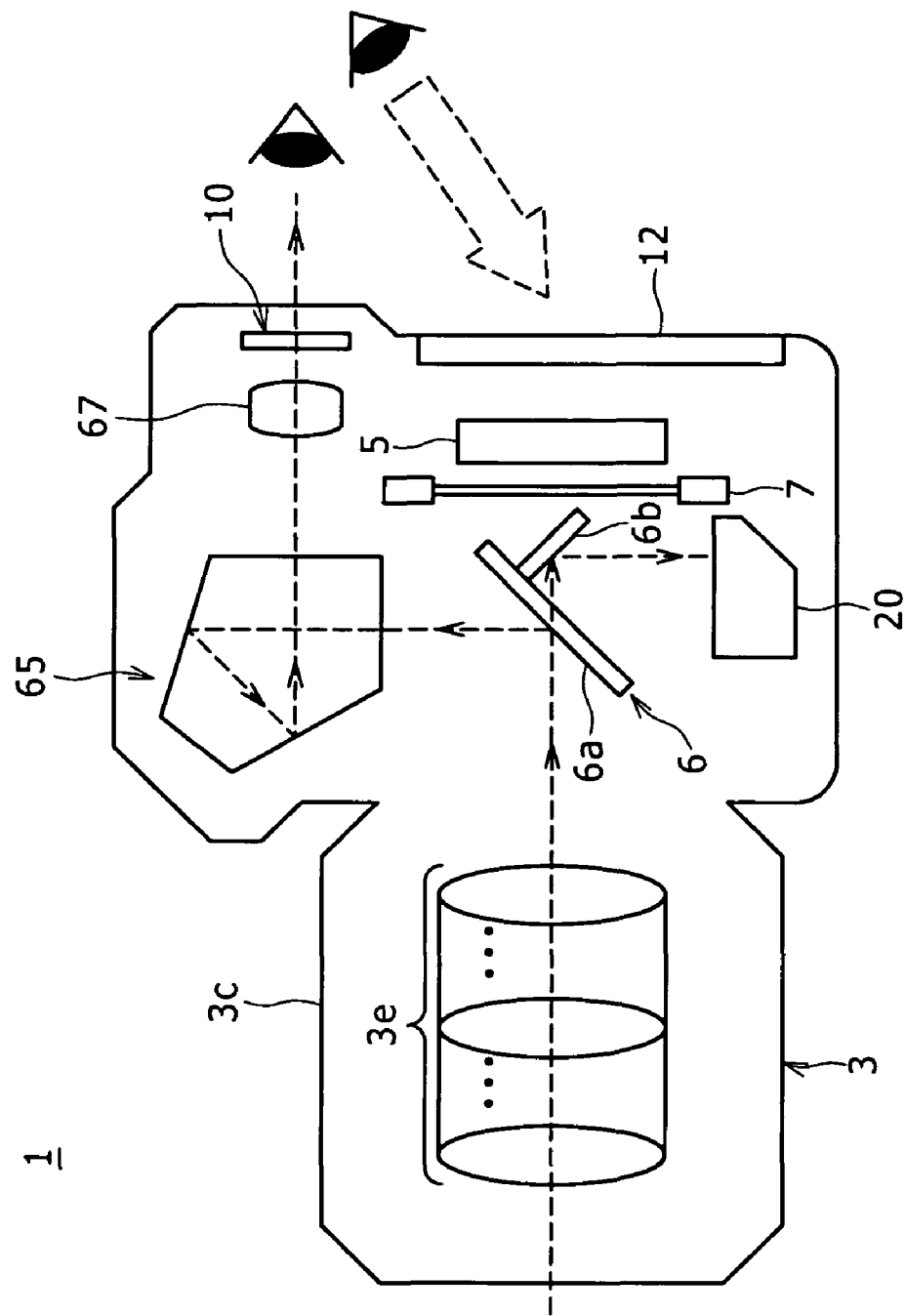
FIG. 4 is a sectional view of the image pickup apparatus (mirror-down condition)

FIGS. 4 and 5 are sectional views of the image pickup apparatus 1. FIG. 4 shows a mirror-down condition, while FIG. 5 shows a mirror-up condition.

As shown in FIGS. 4 and 5, the mirror mechanism 6 is provided on the optical path (photographing optical path) extending from the photographing lens unit 3 to the image sensor 5. The mirror mechanism 6 has a main mirror 6a (main reflecting surface) by which the light coming from the photographing optical system is reflected to the upper side. The main mirror 6a is partly or entirely composed as a half mirror, through which part of the light coming from the photographing optical system is transmitted. In addition, the mirror mechanism 6 has also a sub mirror 6b (sub reflecting surface) by which the light transmitted through the main mirror 6a is reflected to the lower side. The light reflected to the lower side by the sub mirror 6b is guided to and incident on the AF module 20, to be utilized for the AF operation based on the phase difference system.

In the OVF mode, the mirror mechanism 6 is arranged to be in the mirror-down condition until the release button 11 is put into the full-depressed state S2 (namely, during framing) (FIG. 4). In this case, the subject image coming from the photographing lens unit 3 is reflected to the upper side by the main mirror 6a, to be incident on a penta prism 65 as an observation luminous flux, which is further reflected by the penta prism 65 and passes through an eyepiece 67 and the finder window 10, to reach the user's eye. In this manner, framing by use of the optical viewfinder (OVF) is carried out.

Thereafter, when the release button 11 is put into the full-depressed state S2, the mirror mechanism 6 is driven to come into the mirror-up condition, and an exposure operation is started (see FIG. 5). Specifically, as shown in FIG. 5, at the time of exposure, the mirror mechanism 6 is retracted (evacuated) from the photographing optical path. To be more specific, the main mirror 6a and the sub mirror 6b are retracted to the upper side so as not to intercept the light (subject image) coming from the photographing optical system, so that the light coming from the photographing lens unit 3 travels without being reflected by the main mirror 6a, and reaches the image sensor 5 in conformity with an open period of the shutter device 7. The image sensor 5 performs photo-electric conversion to thereby produce an image signal relevant to the subject, based on the luminous flux received. In this manner, the luminous flux from the subject (subject image) is transmitted through the photographing lens unit 3 and guided to the image sensor 5, whereby a shot image relevant to the subject (shot image data) is obtained.

On the other hand, in the EVF mode (referred to also as live view mode), the following operations are performed.

Specifically, the mirror mechanism 6 is arranged to be in the mirror-up condition until the release button 11 is put into the full-depressed state S2 (namely, at the time of framing) (FIG. 5). In this case, the subject image coming from the photographing lens unit 3 advances straight, without being reflected by the main mirror 6a, to be incident on the image sensor 5.

Then, based on the subject image incident on the image sensor 5, the image sensor 5 sequentially obtains time-series images (live-view images) concerning the subject. Specifically, the image sensor 5 sequentially produces a plurality of images at a very short time interval (for example, ⅟60 second). The time-series images thus obtained are sequentially displayed on the back monitor 12. This enables the user to visually check the motion picture (live-view images) displayed on the back monitor 12, and to conduct framing by use of the motion picture. In this manner, framing by use of the live-view images can be performed.

Thereafter, when the release button 11 is put into the full-depressed state S2, an electronic leading curtain and a mechanical trailing curtain (described later) are made to run, whereby an exposure operation is carried out. Then, based on the subject images reaching the image sensor 5 during the open period of the shutter device 7, an image signal relevant to the subject is produced by the photo-electric conversion action of the image sensor 5. In this manner, the luminous flux coming from the subject (subject image) is passed through the photographing lens unit 3 and guided to the image sensor 5, whereby a real shot image concerning the subject (shot image data) is obtained. Further, thereafter, the live-view display is restarted.

<4. Configuration of Shutter Device>

Figure 6:
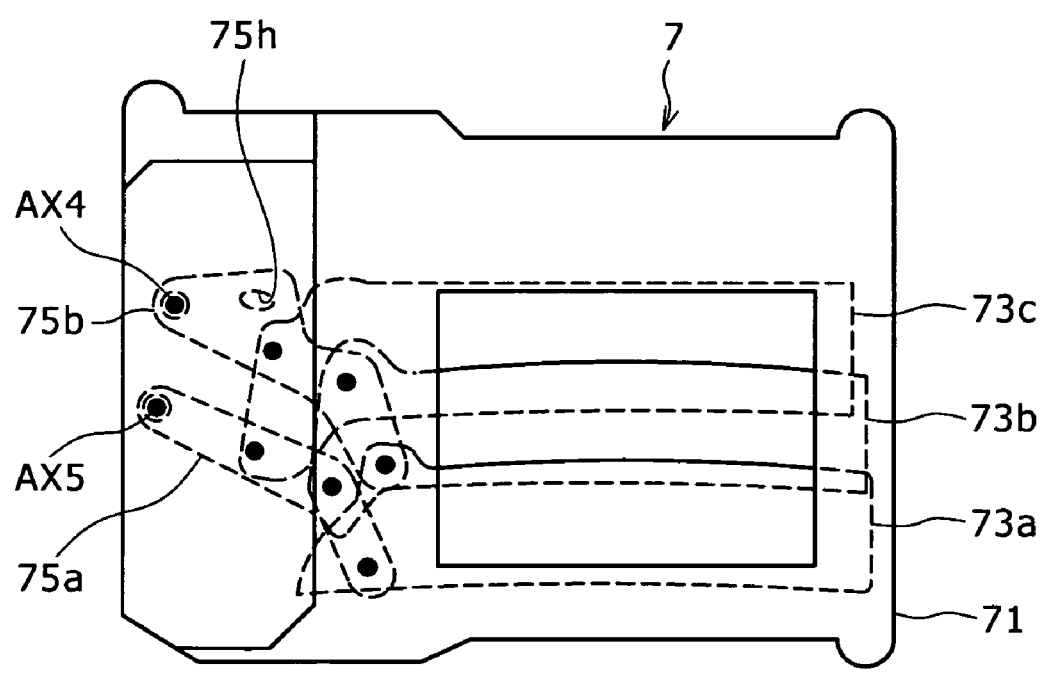
FIG. 6 is a schematic view showing the configuration of a shutter device.
Figure 7:
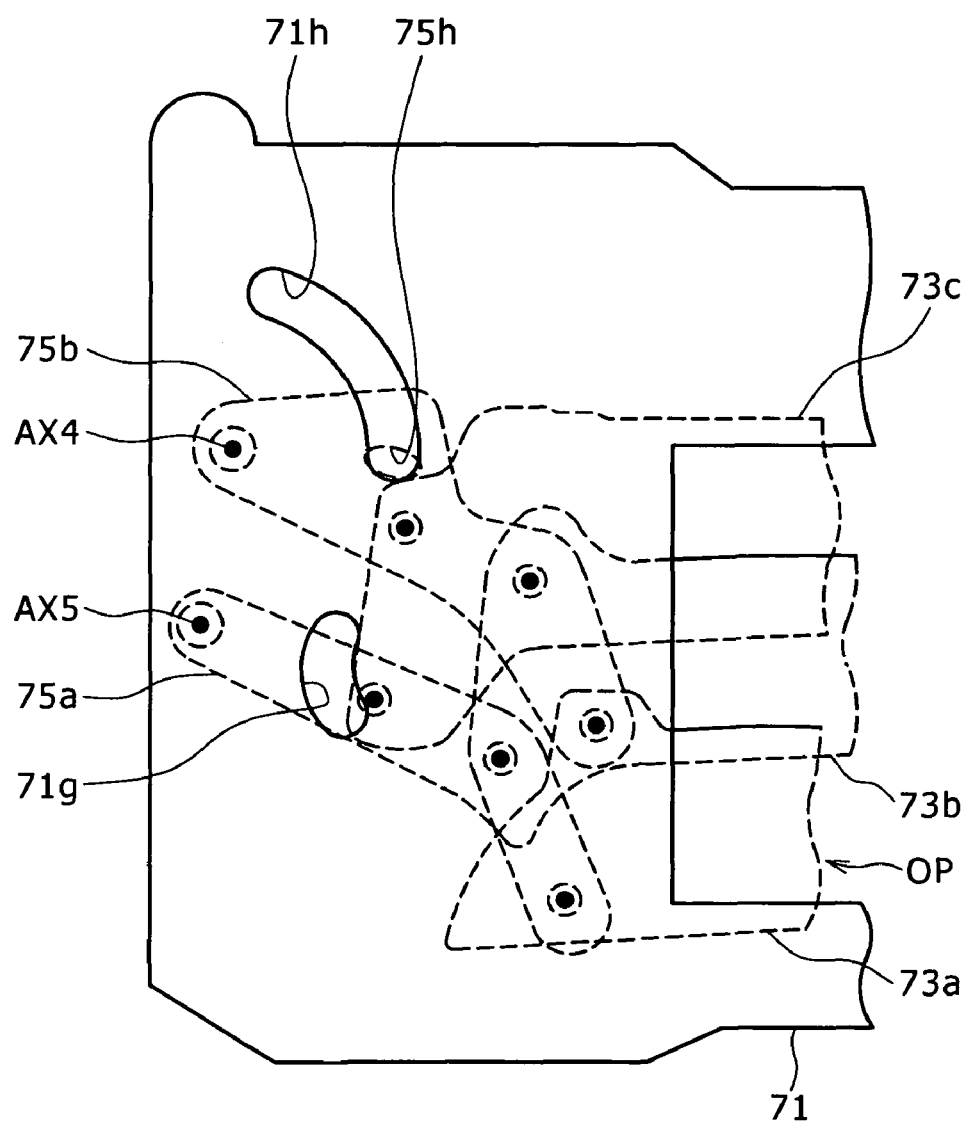
FIG. 7 is an enlarged view showing a part of the shutter device (aperture closed state)
Figure 8:
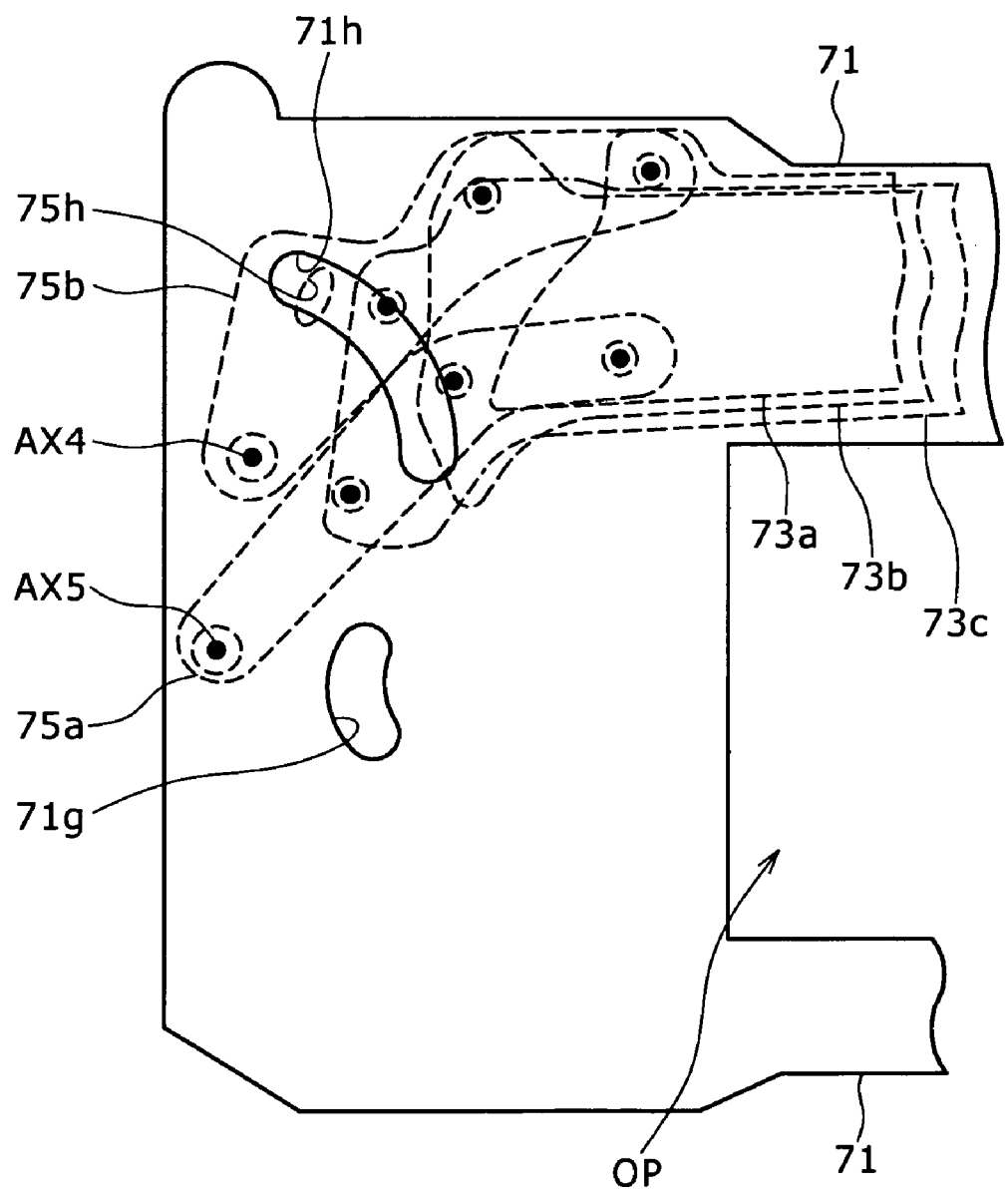
FIG. 8 is an enlarged view showing a part of the shutter device (aperture open state)

FIG. 6 is a schematic view showing the configuration of the shutter device 7. FIGS. 7 and 8 are enlarged views showing a part of the shutter device 7 (the left side of FIG. 6). Incidentally, in FIGS. 6 to 8, the configuration of a trailing curtain (described below) and the like are mainly shown, and the configuration of a driving mechanism 80 (described below) and the like are omitted.

In this image pickup apparatus 1, a so-called "electronic leading curtain" is utilized as a leading curtain in the shutter device 7. For example, an operation in which resetting actions on the basis of a predetermined unit (e.g., line) in the image sensor 5 are sequentially carried out in a predetermined direction corresponds to a "running operation" of the electronic leading curtain. Then, as if chasing after the leading end position of the "electronic leading curtain which is running," the mechanical trailing curtain runs, whereby the exposure operation in the very short period is realized. In this instance, paying attention to a certain pixel in the image sensor (e.g., CMOS) 5, the exposure operation relevant to the pixel is carried out over a period TM(=T2−T1) from the time T1 immediately after the setting (cocking) operation at the image sensor 5 to the time T2 when the "trailing curtain" covers the pixel to intercept the light. The length of this period TM (for example, 1/100 second) corresponds to the shutter speed.

Besides, of a leading curtain and a trailing curtain, only the trailing curtain is mechanically provided in the shutter device 7, and the leading curtain is not provided mechanically.

As shown in FIG. 6, the shutter device 7 has a shutter base plate 71, a group of trailing blades 73a, 73b, 73c, and arms 75a, 75b. In addition, the shutter device 7 has an auxiliary base plate 72 (see FIG. 12) substantially the same in shape as the shutter base plate 71, on the back side of the shutter base plate 71. Both the base plates 71 and 72 are provided to face each other, with a predetermined gap therebetween. The gap between the base plates 71 and 72 is a space for accommodating the trailing blades 73a, 73b, 73c and, therefore, referred to also as "blade chamber."

The shutter base plate 71 has the aperture OP (see also FIG. 8, etc.) for exposure in a substantially central area thereof. Similarly, the auxiliary base plate 72 also has an aperture (opening) OP for exposure in a substantially central area thereof. The aperture OP in the shutter base plate 71 and the aperture OP in the auxiliary base plate 72 have substantially the same shape (substantially rectangular shape) and are provided at mutually corresponding positions. These apertures are integrated with each other in an assembled state of the shutter device 7, to form an exposure aperture (opening) OP of the shutter device 7.

In addition, the shutter base plate 71 is provided with two circular arc-shaped slots 71g, 71h (see FIG. 7). The slot 71g is provided along an arc of a circle having a center on an axis AX3 (described later) (see FIG. 15) and a predetermined radius r1, and the slot 71h is provided along an arc of a circle having a center on an axis AX1 (described later) and a predetermined radius r2.

The trailing blades 73a, 73b, 73c are provided between the shutter base plate 71 and the auxiliary base plate 72. In other words, the trailing blades 73a, 73b, 73c are provided on the rear side of the shutter base plate 71. Each of the trailing blades 73a, 73b, 73c is a sheet-like member having a light-shielding property. The trailing blades 73a, 73b, 73c constitute the "trailing curtain." Incidentally, while the case where the "trailing curtain" is composed of three trailing blades 73a, 73b, 73c is described as an example here, this configuration is not limitative; for example, the trailing curtain may be composed of up to two blades or composed of four or more blades.

Each of the trailing blades 73a, 73b, 73c is rotatably connected to an arm 75a, and is rotatably connected also to an arm 75b. The arm 75a can be turned about an axis AX5, and the arm 75b can be turned about an axis AX4. Incidentally, here, the axis AX4 is the same as the axis AX1 (described later).

As shown in FIGS. 6 and 7, when the arm 75a and the arm 75b are present at predetermined positions, the trailing curtain composed of the trailing blades 73a, 73b, 73c is closing the aperture OP, so that a "closed state of the aperture OP" formed by the trailing curtain is realized. On the other hand, when the arm 75b is rotated counterclockwise about the axis AX4 starting from the just-mentioned condition, the arm 75a is also rotated counterclockwise about the axis AX5, whereby the trailing curtain composed of the trailing blades 73a, 73b, 73c is retracted from the aperture OP, as shown in FIG. 8. In other words, an "open state of the aperture OP" formed by the trailing curtain is realized. On the contrary, when the arm 75b is rotated clockwise about the axis AX4 starting from the condition shown in FIG. 8, the arm 75a is also rotated clockwise about the axis AX5, whereby transition to the "closed state of the aperture OP" shown in FIG. 7 is effected.

Incidentally, the position of each of the trailing blades 73a, 73b, 73c in FIG. 7 is also called "exposure end position," and the position of each of the trailing blades 73a, 73b, 73c in FIG. 8 is also called "exposure start position." The "trailing curtain" covers the aperture OP (FIG. 7) upon running from the exposure start position to the exposure end position, and opens the aperture OP (FIG. 8) upon running from the exposure end position to the exposure start position. In other words, at the exposure start position, the aperture OP is not covered by the trailing curtain but is open, whereas at the exposure end position, the aperture OP is covered by the trailing curtain.

Figure 9:
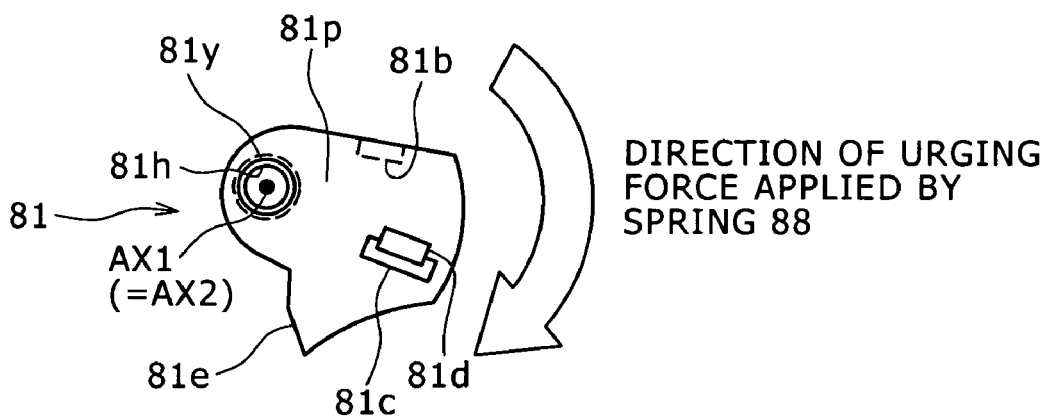
FIG. 9 is a view showing a component part of a driving mechanism.
Figure 10:
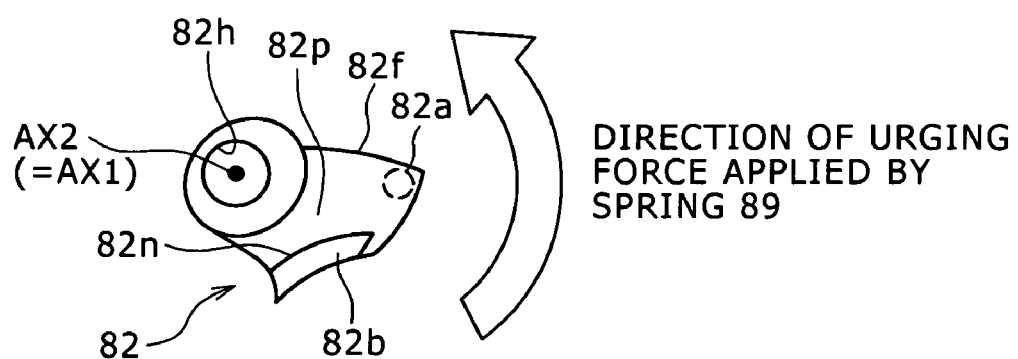
FIG. 10 is a view showing another component part of the driving mechanism.
Figure 11:
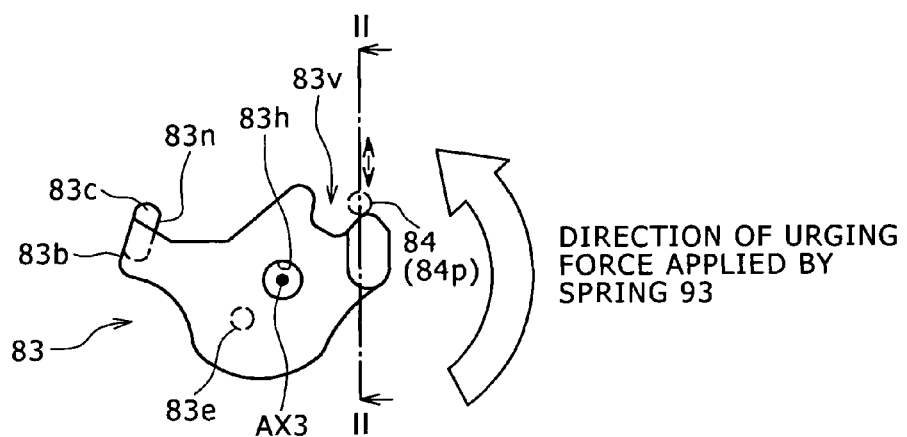
FIG. 11 is a view showing a further component part of the driving mechanism.
Figure 12:
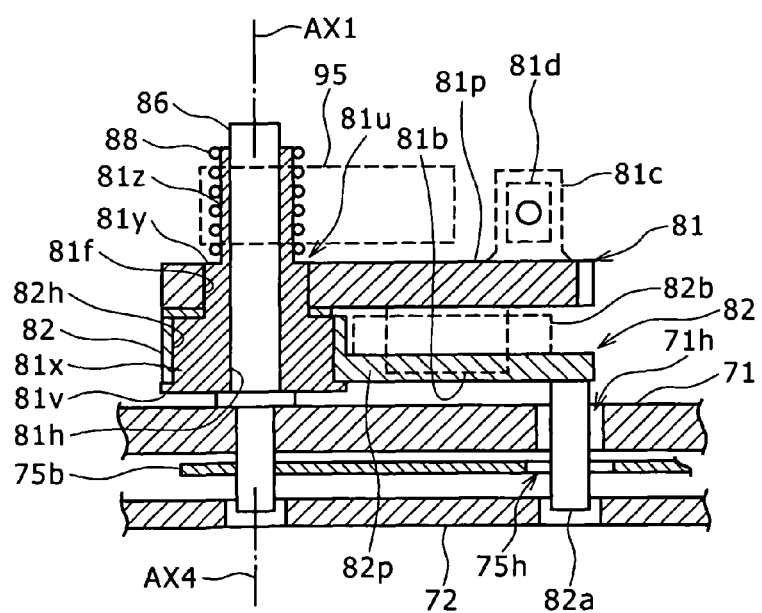
FIG. 12 is a sectional view of the driving mechanism.
Figure 13:
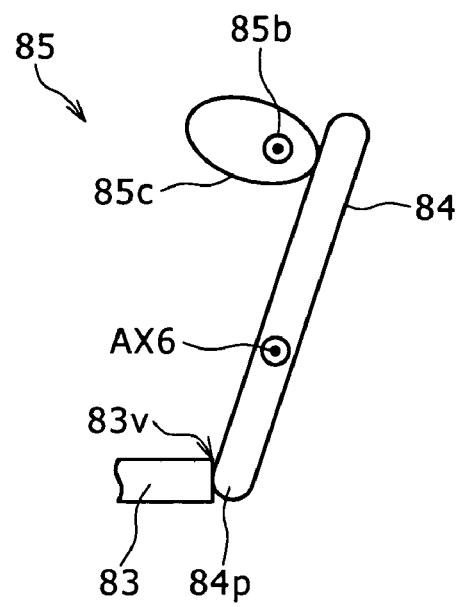
FIG. 13 is a view showing a driving section for driving a charging member.
Figure 14:
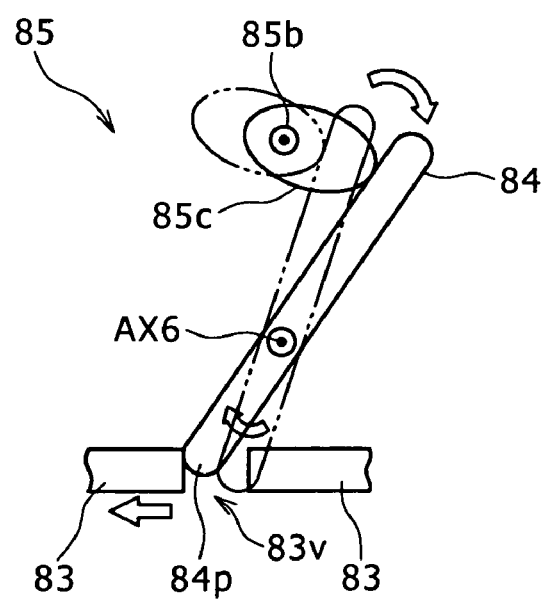
FIG. 14 is a view showing the driving section for driving the charging member.

In addition, the arms 75a, 75b and the trailing curtain are driven by the driving mechanism 80 which will be described below. FIGS. 9 to 11 are views showing some component parts 81, 82, 83 of the driving mechanism 80. FIG. 12 is a sectional view taken along line I-I of the plan view in FIG. 15. FIGS. 13 and 14 are schematic views showing a mechanism 85 for driving the component part (charging member) 83. Besides, FIGS. 15 to 19 are plan views showing a series of operations of the driving mechanism 80. Incidentally, in FIGS. 15 to 19, the driving mechanism 80 is mainly shown, and the trailing curtain (trailing blades 73a, 73b, 73c) and the like are omitted.

Figure 15:
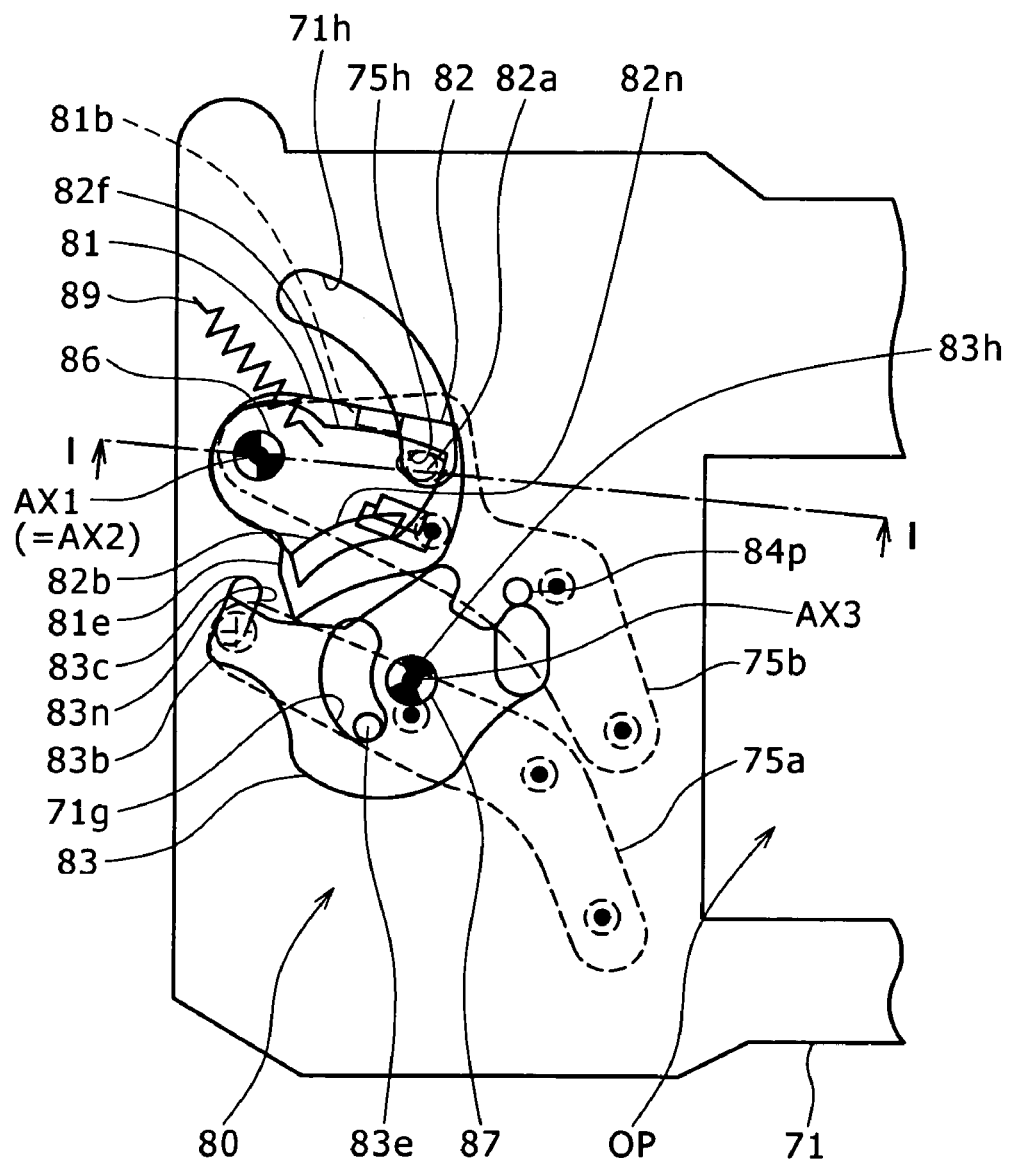
FIG. 15 is a view showing a series of operations of the driving mechanism (a condition immediately upon end of exposure)

As shown in FIG. 15, the driving mechanism 80 has a driving member 81 (FIG. 9), a driving member 82 (FIG. 10), and the charging member 83 (FIG. 11).

The driving members 81, 82 and the charging member (referred to also as setting (cocking) member) 83 are provided on the front side (on the viewer's side of the paper surface of FIGS. 6 and 15, etc.) of the shutter base plate 71.

The driving member 81 is a substantially plate-like rotary body which can be turned about the axis AX1, and the driving member (referred to also as operating member) 82 is a substantially plate-like rotary body which can be turned about an axis AX2. Here, both the driving members 81 and 82 are provided to be turnable about the same axis AX1 (in other words, AX2=AX1). Incidentally, the driving member 81 is provided on the viewer's side of the paper surface, in relation to the driving member 82.

A body-side member (a predetermined member erectly provided on the shutter base plate 71) and the driving member 81 in the shutter device 7 are connected to each other through a spring 88 (see FIG. 12), and a clockwise urging force is applied to the driving member 81 by the spring 88.

In addition, a body-side member (a predetermined member erectly provided on the shutter base plate 71) and the driving member 82 in the shutter device 7 are connected to each other through a spring 89 (see FIG. 15), and a counterclockwise urging force is applied to the driving member 82 by the spring 89.

Here, the urging force applied by the spring 88 is greater than the urging force applied by the spring 89. In other words, the counterclockwise driving force exerted by the driving member 82 is smaller than the clockwise driving force exerted by the driving member 81. Therefore, when the driving force by the driving member 81 is exerted in an "unlocked condition" (FIG. 19) described later, the driving member 82 is rotated clockwise about the axis AX1 together with the driving member 81 by the urging force applied by the spring 88. Thus, the driving member 81 can cause the "trailing curtain" to run from the exposure start position to the exposure end position, by use of the urging force applied by the spring 88. Besides, particularly, the driving member 81 is rotated counterclockwise before the start of running of the "trailing curtain," whereby the clockwise urging force of the spring 88 is increased further. This condition is expressed also as the condition where the spring 88 is overcharged (described later). With the spring 88 thus overcharged, it is possible to rotationally move the driving member 81 and the driving member 82 at a very high speed, and to move the trailing curtain at a very high speed.

Figure 16:
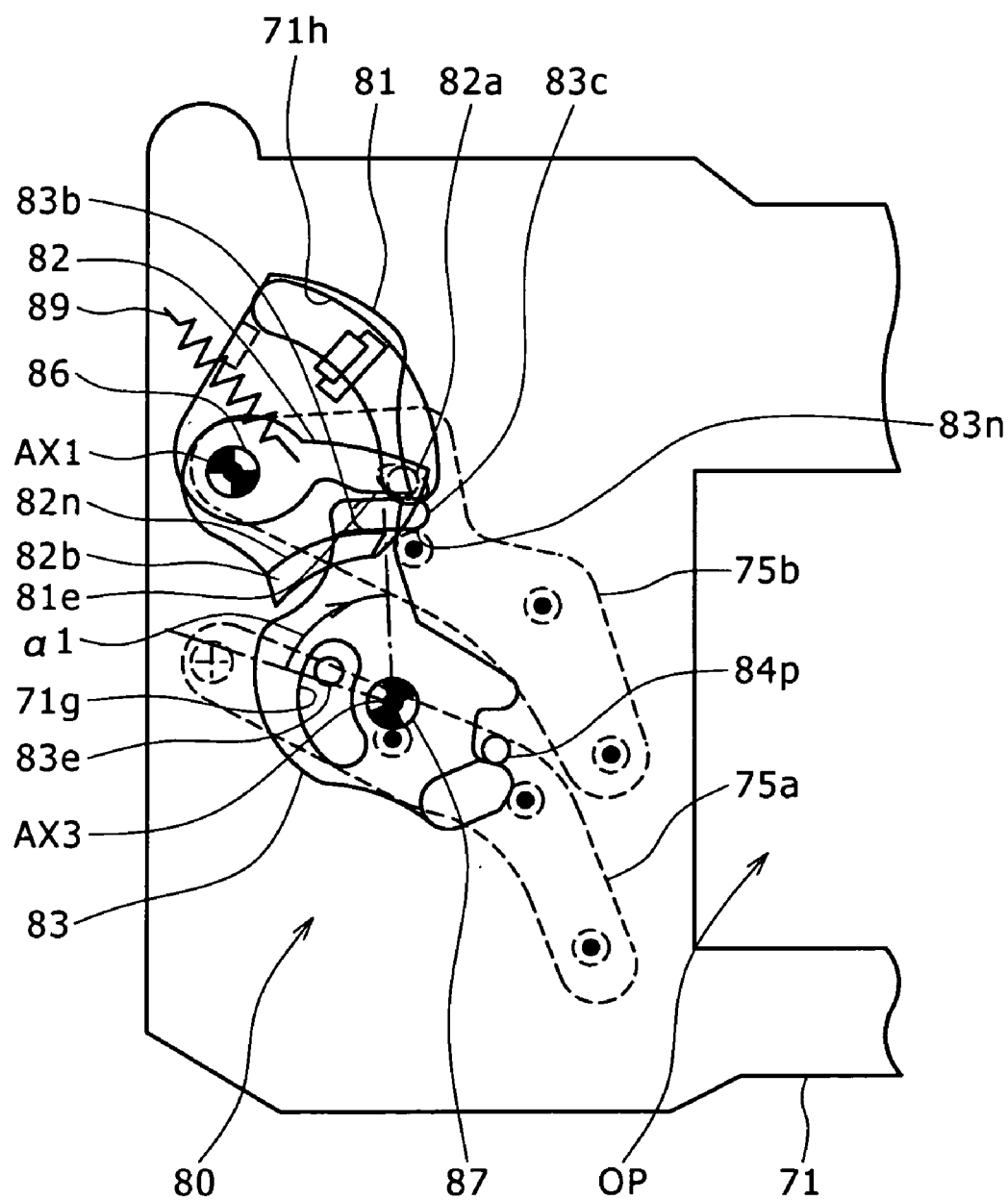
FIG. 16 is a view showing a series of operations of the driving mechanism (a first set condition)
Figure 18:
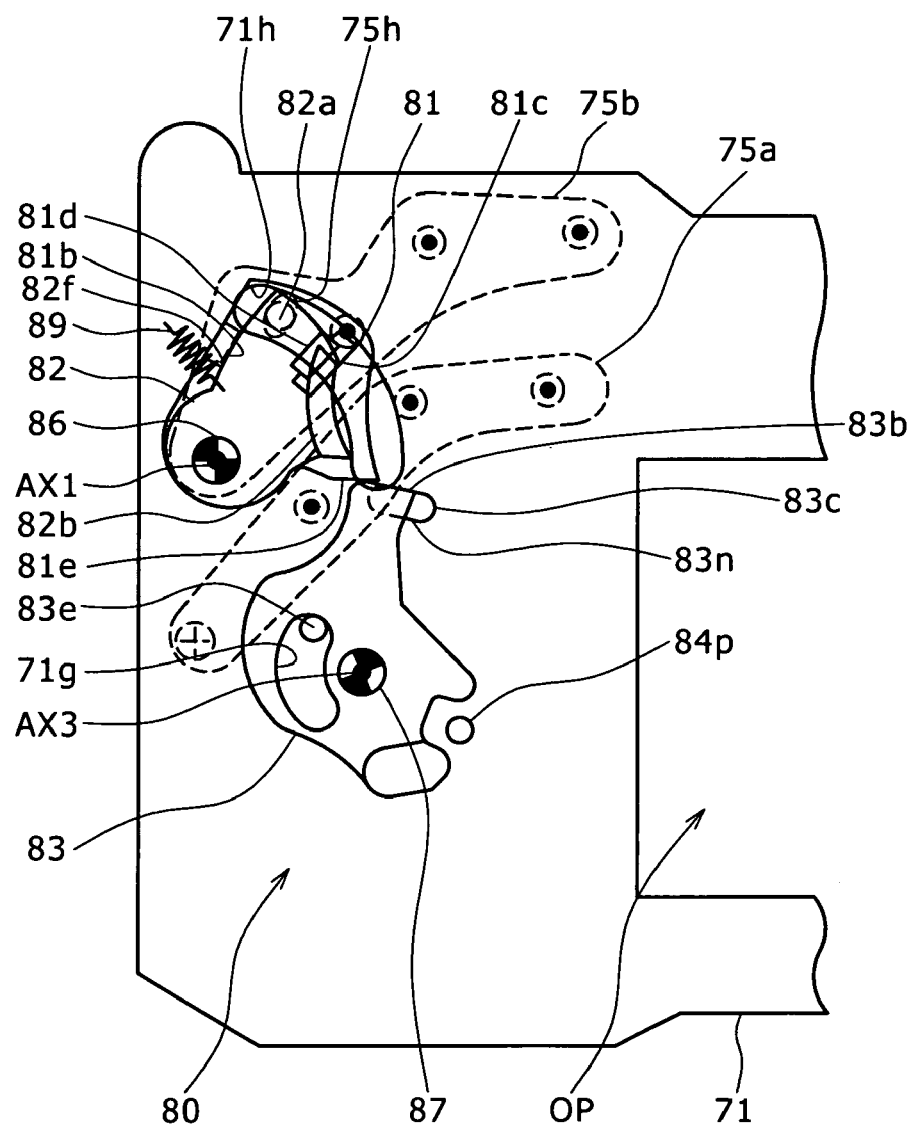
FIG. 18 is a view showing a series of operations of the driving mechanism (a second set condition)

On the other hand, as will be described later, the driving member 82 can also be rotated independently of the driving member 81. For example, during rotation (specifically, during counterclockwise rotation) of the driving member 81, the counterclockwise rotation of the driving member 81 is completed in the condition where rotational movement of the driving member 82 is restrained (FIG. 16). Then, after completion of the rotation of the driving member 81, the driving member 82 is rotated counterclockwise independently of the driving member 81 (FIG. 18). In this instance, the driving member 82 can cause the "trailing curtain" to run from the exposure end position to the exposure start position, by use of the urging force applied by the spring 89. In this manner, the driving member 82 can cause the trailing curtain to run in the direction opposite to the direction of driving by the driving member 81.

As shown in FIG. 12, the driving member 81 is provided in the manner of being stacked over the driving member 82. Specifically, the shutter base plate 71 is erectly provided with a shaft member 86 extending substantially vertically toward the upper side in FIG. 12, and a hole 81h formed in the driving member 81 is in fit (free fit) over the shaft member 86. This configuration enables the driving member 81 to be turned about the shaft member 86 (more specifically, about the center axis AX1 of the shaft member 86).

Specifically, the driving member 81 has a plate part 81p and a shaft part 81u. The shaft part 81u is provided in the periphery of the hole 81h so as to fit over the shaft member 86. The shaft part 81u has a flange part 81v, a large diameter part 81x, an intermediate diameter part 81y, and a small diameter part 81z, in this order from the side of the shutter base plate 71 (the lower side in FIG. 12) toward the upper side.

The above-mentioned spring (specifically, torsion spring) 88 is provided in the state of being wound around the small diameter part 81z.

The intermediate diameter part 81y is in "interference fit" in a hole 81f formed in the plate part 81p of the driving member 81, whereby the plate part 81p and the shaft part 81u are united.

The large diameter part 81x is in "clearance fit" (free fit) in a hole 82h formed in the driving member 82, so that the driving member 82 can be turned about the same axis as the rotational axis AX1 for the large diameter part 81x. In other words, the driving member 82 can be turned about the above-mentioned shaft member 86 (more specifically, about the center axis AX1 of the shaft member 86).

In addition, as shown in FIG. 9, the plate part 81p of the driving member 81 has a substantially sector-like shape in plan view.

The plate part 81p has a projected part 81b at a radius part on one side (the upper side in FIG. 9), of two radius parts of the substantially sector-like shape. The projected part 81b is projected from a back surface of the plate part 81p further to the depth side (back side). As will be described later, the projected part 81b comes into contact with a contact surface 82f of the driving member 82 to which a counterclockwise urging force is applied, so that counterclockwise rotation of the driving member 82 is restricted by the projected part 81b.

Besides, the plate part 81p has a contact surface 81e at a radius part on the other side (the lower side in FIG. 9), of the two radius parts of the substantially sector-like shape. As will be described later, the contact surface 81e makes contact with an arm part 83b of the charging member 83 at the time of an overcharging operation (described later) concerning the spring 88. A rotational driving force supplied from the charging member 83 is transmitted through the arm part 83b and the contact surface 81e, whereby the overcharging operation relating to the spring 88 is performed.

Further, the plate part 81p has a projected part 81c in the vicinity of an outer peripheral part of the substantially sector-like shape. The projected part 81c is projected from the front surface of the plate part 81p further to the front side (the viewer's side of the paper surface of FIG. 9). An iron piece member 81d is fixed to the projected part 81c. In addition, an electromagnet 95 is provided at the same position (or the same height) as the iron piece member 81d in the height direction in FIG. 12. When the driving member 81 has a rotational angle shown in FIG. 19 (described later), the iron piece member 81d facing the electromagnet 95 can be attracted onto the electromagnet 95 by the electromagnet 95. As will be described later, therefore, by the attraction of the iron piece member 81d by the electromagnet 95, also, the rotational movement of the driving member 81 can be restrained (see FIG. 19).

As shown in FIG. 10, the driving member 82 has a substantially sector-like shape, like the driving member 81.

The driving member 82 has a contact surface 82f at a radius part on one side (the upper side in FIG. 10), of two radius parts of the substantially sector-like shape.

In addition, the driving member 82 has a link pin 82a on the side of an outer peripheral part of the substantially sector-like shape. The link pin 82a is provided to project from the back surface of the driving member 82 further to the depth side (back side). Particularly, the link pin 82a is provided to penetrate the slot 71h in the shutter base plate 71 and a hole 75h formed in the arm 75b (see FIGS. 12 and 15). Besides, in the circular arc direction (longitudinal direction) of the circular arc-shaped slot 71h, the diameter of the hole 75h and the diameter of the link pin 82a are approximately equal. Therefore, when the link pin 82a is moved attendant on a turning motion of the driving member 82 about the axis AX1, the arm 75b is turned about the axis AX4 by the link pin 82a, whereby moving operations of the trailing blades 73a, 73b, 73c, or opening and closing operations of the "trailing curtain" are realized. Thus, the "trailing curtain" is operated in conjunction with the link pin 82a, whereby a closed condition of FIG. 7 and an open condition of FIG. 8 are realized.

Further, the driving member 82 has a circular arc-shaped projected part 82b on the side of a outer peripheral part of the substantially sector-like shape. The circular arc-shaped projected part 82b is projected from the front surface of the driving member 82 further to the front side (the viewer's side of the paper surface of FIG. 10). A contact surface 82n, which is a side surface on the axis AX1 side of the circular arc-shaped projected part 82b, is formed so as to constitute a part of an arc of a circle having a center on the rotational center axis AX3 of the charging member 83 and a radius equal to a predetermined length r3 (see FIG. 15, also). As will be described later, by the contact of a contact surface 83n of an engaging part 83c of the charging member 83 with the contact surface 82n of the circular arc-shaped projected part 82b of the driving member 82, counterclockwise rotation of the driving member 82 is restrained.

As shown in FIG. 11, the charging member 83 is a rotary body which can be turned about the axis AX3. Specifically, as shown in FIG. 15, the shutter base plate 71 is erectly provided, at a plan-view position different from that of the shaft member 86, with a shaft member 87 extending substantially perpendicularly toward the viewer's side of the paper surface of the figure. In addition, a hole 83h (FIG. 11) in the charging member 83 is in fit (free fit) over the shaft member 87. Such a configuration enables the charging member 83 to be turned about the shaft member 87 (more specifically, about the center axis AX3 of the shaft member 87).

Besides, the charging member 83 is provided with a recessed part 83v. A tip part 84p (see FIG. 13) of a link member 84 mechanically connected to a predetermined drive source (motor or the like) 85d (not shown) is engaged with the recessed part 83v.

FIG. 13 is a sectional view taken along line II-II of FIG. 11. As shown in FIG. 13, a cam 85c is provided to be turnable about a shaft 85b connected to the drive source 85d. In addition, the link member 84 is provided at such a position as to make contact with an outer peripheral surface of the cam 85c. The link member 84 is provided in the state of being turnable about an axis AX6 and being urged counterclockwise. By this urging force, the link member 84 is pressed against the outer peripheral surface of the cam 85c. Therefore, as the cam 85c is rotated, the outer peripheral surface of the cam 85c is moved while sliding on the link member 84.

In this instance, the rotating motion of the cam 85c is converted into a swinging motion of the link member 84 about the axis AX6. Then, for example when the cam 85c is rotated from the state of FIG. 13 to the state of FIG. 14, the tip part 84p of the link member 84 is moved toward the left side in FIG. 14 (toward the lower side in FIG. 11). Incidentally, on the contrary, when the cam 85c is rotated from the state of FIG. 14 to the state of FIG. 13, the tip part 84p of the link member 84 is moved toward the right side in FIG. 14 (toward the upper side in FIG. 11).

Then, when the tip part 84p of the link member 84 is moved in the vertical direction in FIG. 11 (in the direction of double arrow in FIG. 11), the charging member 83 is turned about the axis AX3, whereby rotational angle of the charging member 83 is varied.

In addition, the charging member 83 has an arm part 83b projecting outward to the substantially opposite side of the axis AX3 from the recessed part 83v. The substantially plate-like charging member 83 is disposed at the same position (same height) as the driving member 81, in the vertical direction in FIG. 12, and the arm part 83b is also disposed at the same height as the driving member 81. Therefore, as will be described later, when the charging member 83 receives a force from the tip part 84p of the link member 84 and is rotated clockwise about the axis AX3, the arm part 83b of the charging member 83 pushes the contact surface 81e of the driving member 81, to rotationally move the driving member 81 counterclockwise. As a result, the clockwise urging force of the spring 88 is further increased, that is, the spring 88 is overcharged. The arm part 83b is expressed also as a "pushing part" which pushes the contact surface 81e to move, and the contact surface 81e is expressed also as a "pushed part (pushed surface)" which is pushed to move by the arm part 83b.

Besides, the charging member 83 has an engaging part 83c (see FIG. 11). The engaging part 83c is provided at a tip part of the arm part 83b so as to project from the back surface of the arm part 83b further to the depth side (back side). When the charging member 83 is rotated clockwise about the axis AX3 with its arm part 83b pushing the contact surface 81e, the engaging part 83c passes through a space between the plate part 81p of the driving member 81 and the plate part 82p of the driving member 82 (see FIGS. 12 and 16). Specifically, the contact surface 83n on the axis AX3 side of the engaging part 83c is moved while making contact with the contact surface 82n of the circular arc-shaped projected part 82b of the driving member 82. By this contact, counterclockwise rotation of the driving member 82 is restrained.

Further, the charging member 83 has a pin 83e. The pin 83e is provided at a position spaced by about a distance r2 from the axis AX3 of the charging member 83 so as to project from the back surface of the charging member 83 further to the depth side (back side). The pin 83e is inserted in the slot 71g in the shutter base plate 71.

To the charging member 83, a urging force for counterclockwise rotation is applied by a spring 93 (not shown). As shown in FIG. 15, by the contact of the pin 83e with the lower end of the slot 71g, counterclockwise rotation of the charging member 83 is restrained, and the charging member 83 is stopped in a predetermined position.

<5. Operation of Shutter Device>

Now, operations of the shutter device 7 will be described below referring to FIGS. 15 to 19, etc.

Figure 17:
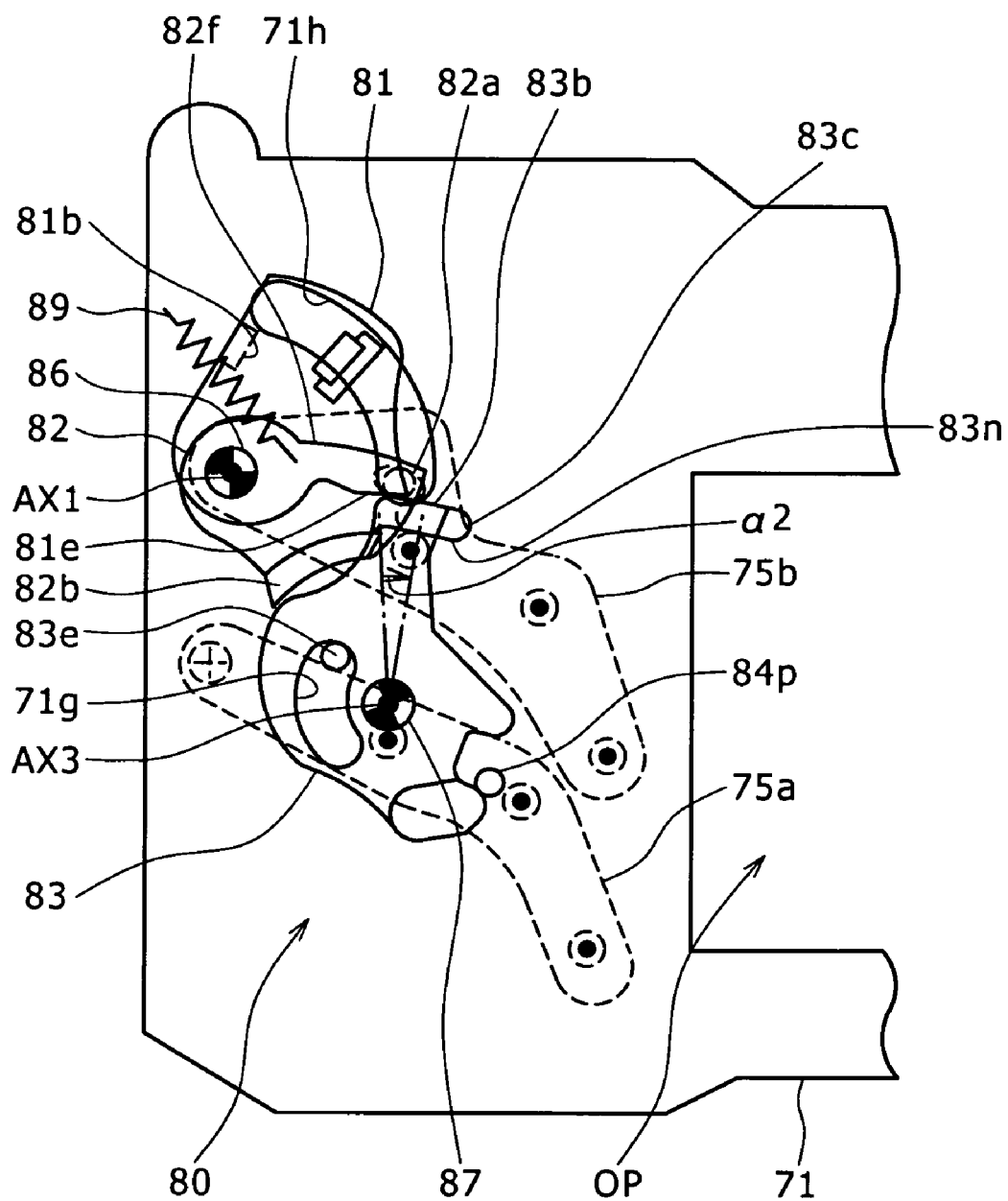
FIG. 17 is a view showing a series of operations of the driving mechanism.
Figure 19:
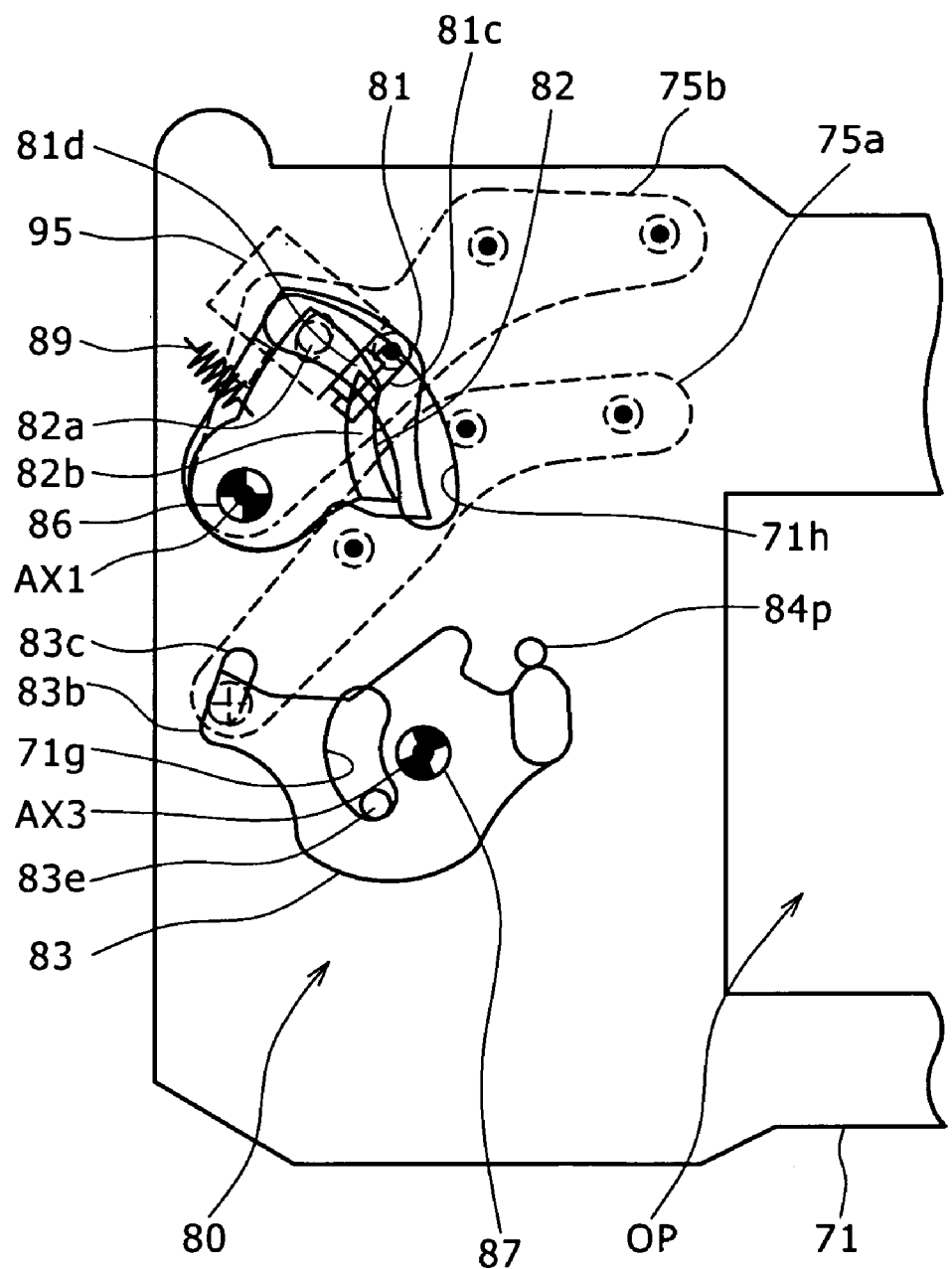
FIG. 19 is a view showing a series of operations of the driving mechanism (a condition immediately before start of exposure)

FIG. 15 shows the condition STa immediately after completion of an exposure operation concerning a certain real shot image, and FIG. 16 shows a first set (cocked) condition ST11 (described later). In FIGS. 15 and 16, the trailing curtain is present at an exposure end position, and is covering the aperture OP (closed condition (see FIG. 7)). On the other hand, in FIGS. 18 and 19, the trailing curtain is present at an exposure start position, and is retracted from the aperture OP (open condition (see FIG. 8)). FIG. 18 shows a second set (cocked) condition ST12 (described later), and FIG. 19 shows the condition STb immediately before start of an exposure operation concerning the next real shot image. Incidentally, FIG. 17 shows an intermediate condition between the condition ST11 shown in FIG. 16 and the condition ST12 shown in FIG. 18.

As shown in FIG. 15, in the condition STa immediately upon completion of a certain exposure operation, the driving member 81 is being urged clockwise about the axis AX1 by the urging force of the spring 88, and its projected part 81b is in contact with the contact surface 82f. Since the urging force of the spring 88 is greater than the urging force of the spring 89, a force for rotating the driving member 82 clockwise about the axis AX1 is applied to the driving member 82 by the driving member 81 through the projected part 81b and the contact surface 82f. In this instance, the link pin 82a of the driving member 82 comes into contact with the lower end of the slot 71h, and stops in situ. Therefore, the component parts 81, 82, 83 are stopped in the states as shown in FIG. 15. Incidentally, for absorbing the shock upon collision of the link pin 82a on the lower end of the slot 71h, a shock absorber is preferably provided at the lower end of the slot 71h.

In addition, in FIG. 15, the pin 83e makes contact with the lower end of the slot 71g, counterclockwise rotation of the charging member 83 is thereby restrained, and the charging member 83 is being stopped in a predetermined position. Incidentally, for absorbing the shock upon collision of the pin 83e on the lower end of the slot 71g, a shock absorber is preferably provided at the lower end of the slot 71g.

Now, an operation for transition from the condition STa shown in FIG. 15 to the condition ST11 shown in FIG. 16 will be described below.

First, the tip part 84p of the link member 84 is moved downwards in FIG. 15 by the drive source 85d, and the charging member 83 is rotated clockwise about the axis AX3. In this case, the arm part 83b pushes the contact surface 81e, and a pushing force is transmitted to the driving member 81.

Therefore, by the pushing force transmitted to the contact surface 81e, the driving member 81 is rotated counterclockwise about the axis AX1.

It is to be noted here, however, that since the engaging part 83c is projecting to the tip side along the clockwise direction as compared with the arm part 83b, the contact surface 83n of the engaging part 83c starts making contact with the contact surface 82n of the circular arc-shaped projected part 82b, before the arm part 83b starts pushing the contact surface 81e. Then, as the charging member 83 is further rotated clockwise about the axis AX3, the contact surface 83n of the engaging part 83c is moved along the contact surface 82n of the circular arc-shaped projected part 82b. In other words, during transition to the first set condition ST11, the engaging part 83c of the charging member 83 locks the circular arc-shaped projected part 82b of the second driving member 82 while moving along the circular arc-shaped projected part 82b. Therefore, the driving member 82 is inhibited from rotating counterclockwise about the axis AX1 in the manner of following up to the driving member 81 under the urging force of the spring 89. Thus, the engagement of the engaging part 83c with the circular arc-shaped projected part 82b restrains movement of the driving member 82.

Then, when the charging member 83 is rotated clockwise about the axis AX3 by an angle α1 (e.g., about 70 degrees) until the condition ST11 shown in FIG. 16 is reached, the driving member 81 is rotated counterclockwise about the axis AX1 by a predetermined angle, to stop in the condition where its contact surface 81e is supported by the arm part 83b. This makes it possible to further increase the clockwise urging force of the spring 88, in other words, to further increase the accumulated energy of the spring 88. That is, spring energy can be charged. In the condition ST11 shown in FIG. 16, the urging force of the spring 88 is further increased as compared with that in the condition STa shown in FIG. 15; therefore, the condition shown in FIG. 16 is expressed also as the condition where the spring 88 is overcharged. In this manner, an overcharging operation for the spring 88 is carried out.

During such an overcharging operation, the engaging part 83c continues being engaged with the circular arc-shaped projected part 82b, so that movement of the driving member 82 is kept restrained. Therefore, the link pin 82a of the driving member 82 also is not moved, and the trailing curtain is maintained in the exposure end position. In other words, the closed state of the aperture OP formed by the trailing curtain is maintained.

As above-mentioned, during the operation for transition from the condition STa to the condition ST11, the charging member 83 rotates the first driving member 81 counterclockwise about the axis AX1 while restraining movement of the second driving member 82. This makes it possible to overcharge the spring 88 while maintaining the closed state of the aperture OP formed by the trailing curtain, and thereby to transfer the shutter device 7 into the first set condition ST11.

Thus, the condition (the "first set condition") ST11 shown in FIG. 16 is a condition where the spring 88 is overcharged while the closed state of the aperture OP formed by the trailing curtain is maintained. In the first set condition ST11, the arm part 83b of the charging member 83 is in contact with the driving member 81 and is supporting the driving member 81, whereby rotational movement of the driving member 81 is restrained. Therefore, the trailing curtain can be maintained in the aperture-closing state, without energizing the electromagnet 95. When the first set condition ST11 is utilized particularly in the OVF mode, as will be described later, power saving in a framing operation can be promised.

Now, an operation for transition from the condition (first set condition) ST11 shown in FIG. 16 to the condition (second set condition) ST12 shown in FIG. 18 will be described below.

When the charging member 83, starting from the condition ST11 shown in FIG. 16, is further rotated clockwise about the axis AX3 by a predetermined angle α2 (e.g., about 10 degrees) by a driving operation performed by the drive source 85d and the link member 84, temporary transition to the condition (intermediate condition) shown in FIG. 17 is brought about.

In the condition ST11 shown in FIG. 16, the circular arc-shaped projected part 82b is in engagement with the engaging part 83c. However, when a further rotational movement of the circular arc-shaped projected part 82b by the angle α2 is thereafter effected to establish the condition shown in FIG. 17, the circular arc-shaped projected part 82b and the engaging part 83c are disengaged from each other. Therefore, the locking of the second driving member 82 by the charging member 83 is released, and the driving member 82 starts being rotated counterclockwise about the axis AX1 by the urging force of the spring 89. The rotating motion of the driving member 82 is stopped by abutment of the contact surface 82f on the projected part 81b (see FIG. 18). When the link pin 82a is moved along the circular arc-shaped slot 71h according to the rotating motion of the driving member 82, the arm 75b is turned counterclockwise about the axis AX4 (=AX1). This results in that the trailing blades 73a, 73b, 73c are each moved to an exposure start position (in other words, an opening position for the aperture OP). Thus, an aperture-opening operation of the "trailing curtain" is realized (see FIGS. 8 and 18).

Besides, in this case, the arm part 83b of the charging member 83 continues making contact with the contact surface 81e of the driving member 81, so that the driving member 81 is being supported by the arm part 83b. In this manner, rotational movement of the driving member 81 is restrained.

As above-mentioned, during the operation for transition from the first set condition ST11 to the second set condition ST12, the charging member 83 releases the restraint on movement of the second driving member 82, while supporting the first driving member 81. Then, the charging member 83 permits the second driving member 82 to be rotated counterclockwise about the axis AX1 by the urging force of the spring 89. By this, the trailing curtain is moved to the exposure start position. As a result, the shutter device 7 can be transferred into the second set condition ST12 while maintaining the overcharged state of the spring 88 while forming the open state of the aperture OP by the trailing curtain.

In addition, the condition ST12 shown in FIG. 18, or the "second set condition," is a condition where the trailing curtain has been brought into the aperture-opening state while keeping the spring 88 overcharged. In the second set condition ST12, the arm part 83b of the charging member 83 is in contact with the driving member 81 and is supporting the driving member 81, whereby rotational movement of the driving member 81 is being restrained. Therefore, the trailing curtain can be maintained in the aperture-opening state, without energizing the electromagnet 95. When the second set condition ST12 is utilized particularly in the live view mode, power saving in a framing operation can be promised.

In addition, with only the charging member 83 rotated further by a predetermined angle from the first set condition ST11, the engagement between the engaging part 83c and the circular arc-shaped projected part 82b can be released and the aperture-opening state of the trailing curtain can be realized, while maintaining the support of the driving member 81 by the charging member 83. In other words, the second set condition ST12 can be formed by use of a simple configuration. Especially, there is no need to provide a lock member for locking the driving member 81, separately from the charging member 83, so that simplification of configuration can be achieved.

Now, an operation for transition from the condition (second set condition) ST12 shown in FIG. 18 to the condition (condition immediately before start of exposure) STb shown in FIG. 19 will be described below.

When the release button 11 is depressed into the S2 state in the condition ST12 shown in FIG. 18, energization of the electromagnet 95 (see FIG. 19) is started. Specifically, energization of the electromagnet 95 is started in response to input of a shooting command. The electromagnet 95 is provided at such a position as to face the iron piece member 81*d* of the driving member 81. By the energization of the electromagnet 95, the iron piece member 81*d* is attracted onto the electromagnet 95, and clockwise rotating motion of the driving member 81 is restrained. In addition, even though the urging force of the spring 89 tends to turn the driving member 82 counterclockwise, the abutment of the contact surface 82*f* of the driving member 82 on the projected part 81*b* of the driving member 81 ensures that turning motion of the driving member 82 is kept restrained. Accordingly, turning motion of the driving member 81 and turning motion of the driving member 82 are both kept restrained.

Thereafter, the charging member 83 is driven by the link member 84 and the like, to be turned counterclockwise about the axis AX3. In response to this turning motion, the arm part 83*b* of the charging member 83 is released from contact with the contact surface 81*e* of the driving member 81, and the support of the driving member 81 by the charging member 83 is released. In other words, the locking of the driving member 81 by the charging member 83 is released. Then, the charging member 83 is moved to an avoiding position (referred to also as retracted position or reference position) for avoiding contact with the driving member 81 (see FIG. 19). Incidentally, this condition is a condition where the locking of the driving member 81 by the charging member 83 is released; therefore, this condition is referred to also as "unlocked condition."

In this manner, transition to the condition STb shown in FIG. 19 is finished. The condition shown in FIG. 19 is the condition immediately before start of exposure.

Thereafter, the electronic leading curtain is made to run, and then energization of the electromagnet 95 is stopped at a predetermined timing. In response to the stop of energization, the driving member 81, on which the attracting force of the electromagnet 95 is not acting now, is rotated clockwise about the axis AX1 by the urging force of the spring 88. In addition, the urging force of the spring 88 is transmitted from the projected part 81*b* of the driving member 81 to the contact surface 82*f* of the driving member 82, whereby the driving member 82 is also rotated clockwise about the axis AX1. In this case, since the spring 88 has been overcharged, the driving member 81 and the driving member 82 can be moved at a very high speed. Besides, attendant on the moving of the driving member 82, the link pin 82*a* is moved along the slot 71*h*. The link pin 82*a* is stopped upon reaching a lower end part of the slot 71*h* (see FIG. 15). Attendant on the movement of the link pin 82*a*, the arm 75*b* is turned clockwise about the axis AX4, and the trailing blades 73*a*, 73*b*, 73*c* are each moved to an exposure end position (in other words, a closing position for the aperture OP). As a result, return to the condition STa shown in FIG. 15 is effected, and an aperture-closing operation of the "trailing curtain" is realized.

In this manner, after the electronic leading curtain is made to run, energization of the electromagnet 95 is stopped at a predetermined timing, whereby the mechanical trailing curtain (specifically, a curtain called "mechanical trailing curtain") is made to run. In this manner, a shutter operation by means of the so-called "electronic leading curtain" and "mechanical trailing curtain" is carried out, whereby an exposure operation for exposing each pixel to light for a predetermined period TM can be performed.

In the manner as above-described, the operation for transition from the condition STb immediately before start of exposure shown in FIG. 19 to the condition STa immediately after end of exposure shown in FIG. 15 is realized.

<6. Shutter Operation at the Time of Shooting Based on Live View>

Figure 20:
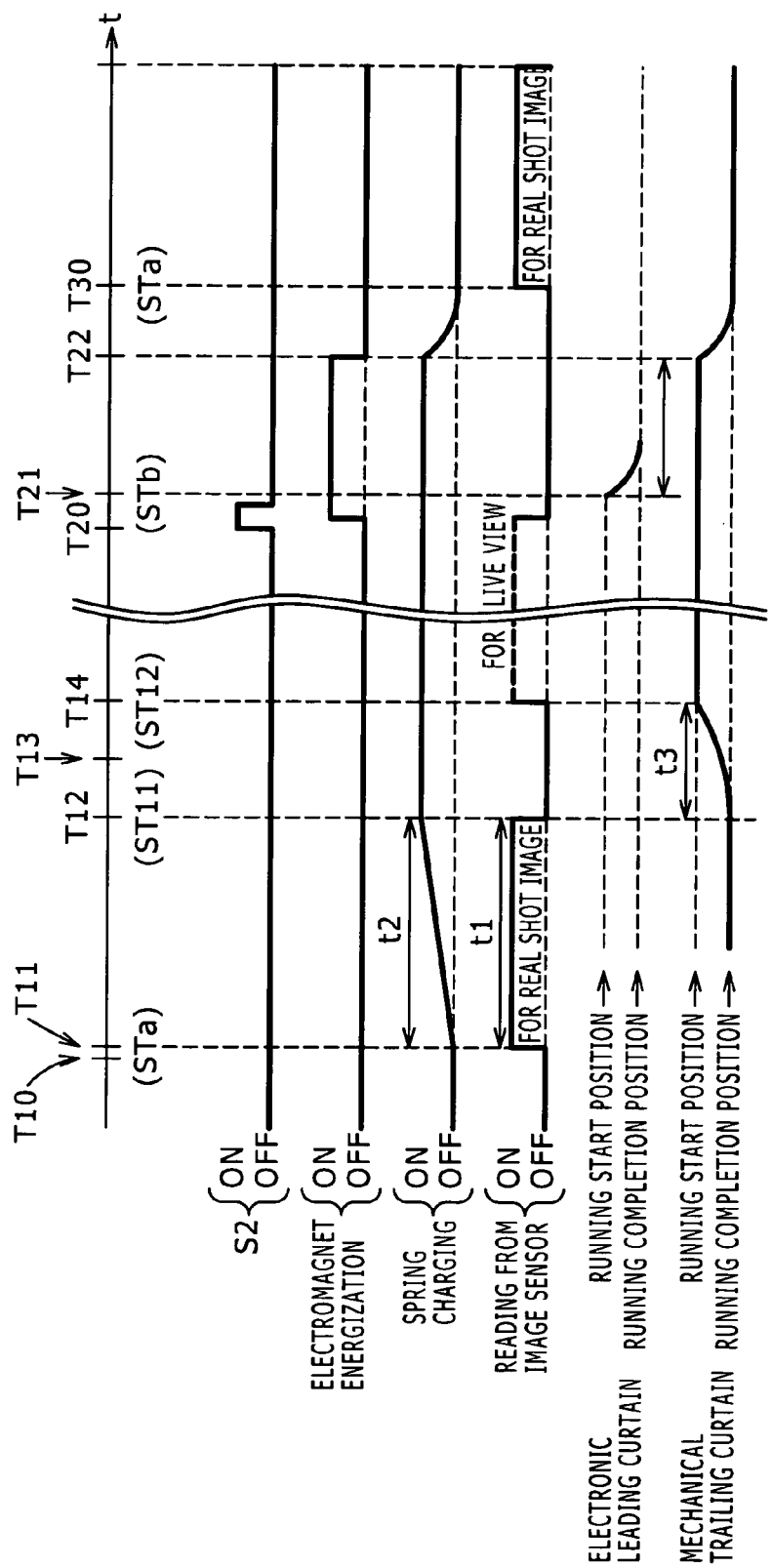
FIG. 20 is a time chart pertaining to a shooting operation at the time of a live view mode.

FIG. 20 is a time chart relating a shooting (photographing) operation in the live view mode. In the following, the shooting operation in the live view mode will be described more in detail, referring to FIG. 20.

First, it is assumed that exposure is completed at time T10, and transition to the condition STa shown in FIG. 15 (from the condition STb shown in FIG. 19) is effected.

Then, as above-mentioned, at time T11 immediately after time T10, an operation for transition from the condition STa (FIG. 15) immediately after end of exposure to the first set condition ST11 (FIG. 16) is started. In addition, at time T11, a process of reading pixels from the image sensor 5 is started. Concurrently with the pixel reading process, the overcharging operation for the spring 88 is carried out. In this case, the aperture-closing state of the trailing curtain is maintained. Therefore, the process of reading a plurality of pixels in the image sensor 5 can be appropriately carried out, while keeping the trailing curtain in the aperture-closing state and thereby avoiding multiple exposure.

Thereafter, at time T12, the overcharging of the spring 88 is completed, and the process of reading pixels from the image sensor 5 is completed. Then, the pixel signal read from the image sensor 5 is subjected to processings by the digital signal processing circuit 53 (see FIG. 3) and the like, whereby image data concerning a real shot image is produced. Incidentally, at time T12, the operation for transfer to the first set condition ST11 (FIG. 16) has been completed.

Besides, at time T12, an operation for transition to the second set condition ST12 (FIG. 18) is now started. Specifically, in response to a further clockwise rotating motion of the charging member 83, engagement between the engaging part 83*c* and the circular arc-shaped projected part 82*b* is released (time T13 (FIG. 17)). Then, the driving member 82 is rotated, and, according to the rotating motion of the driving member 82, the link pin 82*a* is moved along the slot 71*h*. As a result, the trailing blades 73*a*, 73*b*, 73*c* are each moved to the exposure start position (time T14). At time T14, transfer to the second set condition ST12 (FIG. 18) has been completed.

After time T14 when the "trailing curtain" has been retracted from the aperture OP, a live view displaying operation by use of images obtained by the image sensor 5 can be performed. Specifically, in the image pickup apparatus 1, time-series images relating to a subject image reaching the image sensor 5 through the aperture OP of the shutter device 7 can be displayed on the back monitor 12 at a very short time interval. The user can perform a framing operation by use of the live-view images displayed on the back monitor 12.

When the release button 11 is depressed into the S2 state at time T20 after the framing operation conducted using the live view in the second set condition ST12 as above-mentioned, transfer to the condition (the condition shown in FIG. 19) STb immediately before start of exposure is effected at time T21.

Specifically, energization of the electromagnet 95 is started, and the charging member 83 is rotated counterclockwise about the axis AX3, returning to the reference position.

Then, the electronic leading curtain is started to run at time T21, and, after the lapse of a predetermined period (e.g., 1/100 second), specifically at time T22, the mechanical trailing curtain is started to run in the manner of chasing after the electromagnetic leading curtain. As a result, an exposure operation for an exposure period according to the time difference between the start of running of the electronic leading curtain and the start of running of the mechanical trailing curtain is carried out, and the exposure operation is completed at time T30. At time T30, the shutter device 7 has the same condition STa (FIG. 15) as that at time T10. Thereafter, the above-mentioned pixel reading process and the like are carried out, whereby image data relevant to a real shot image is obtained.

According to the above-described embodiment, during the framing operation by use of the live view (from time T14 to time T20), the overcharged state of the spring 88 can be maintained, without energizing the electromagnet 95. Therefore, power saving can be realized.

In addition, according to the above embodiment, during the period from time T11 to time T12, it is possible to carry out the process of reading pixels from the image sensor 5, while keeping the trailing curtain in the aperture-closing state and thereby avoiding multiple exposure, and to carry out the overcharging operation for the spring 88. Specifically, during the period from the exposure end condition STa to completion of transfer to the first set condition ST11, the process of reading from the image sensor 5 is carried out concurrently with the overcharging operation for the spring 88 in the condition where the closed state of the aperture OP is maintained. Incidentally, such a reading process is controlled by the general control section 101.

Figure 21:
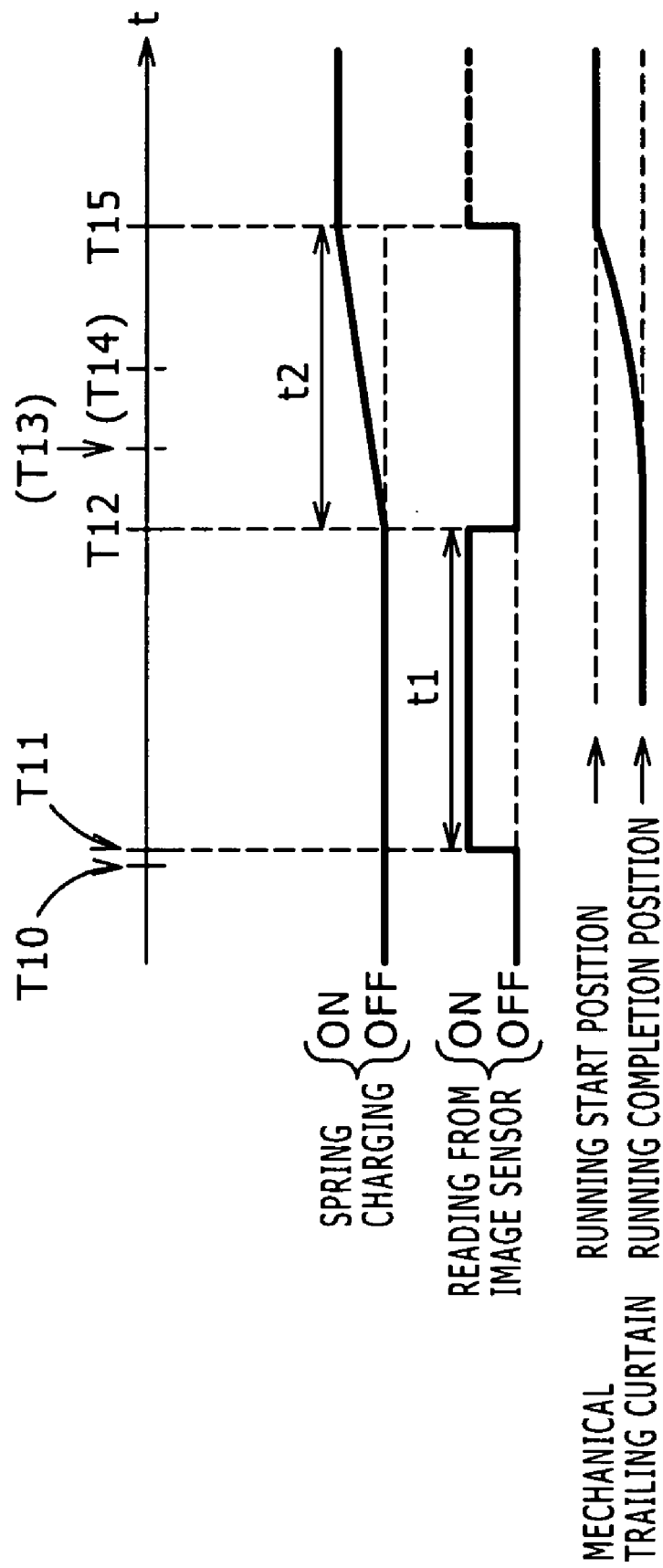
FIG. 21 is a time chart showing an operation pertaining to Comparative Example.

Here, a shutter device in which a trailing curtain is moved to an aperture-opening position concurrently with an overcharging operation for a spring as, for example, in the first related art, is assumed as a comparative example. FIG. 21 is a timing chart showing operations of the shutter device according to the comparative example.

In the shutter device according to the comparative example, the trailing curtain is moved without fail to the aperture-opening position concurrently with the overcharging operation for the spring, so that the spring overcharging operation cannot be carried out while keeping the trailing curtain in the aperture-closing state. Therefore, in the shutter device according to the comparative example, as shown in FIG. 21, various operations are sequentially carried out in the order of first completing the pixel reading operation while keeping the trailing curtain in the aperture-closing state, and thereafter starting the spring overcharging operation.

Therefore, time T15 when the overcharging of the spring is completed in the comparative example is delayed as compared with time T12 when the overcharging is completed in the above-described embodiment. For instance, assuming that the time required for reading pixels from the image sensor 5 has a value t1 (e.g., 100 milliseconds) and the overcharging time has a value t2 (e.g., 100 milliseconds), the sum ((t1+t2) second, for example, 200 milliseconds) of both the times is taken until completing the overcharging in the shutter device according to the comparative example.

According to the operations in the above-described embodiment, on the other hand, the period taken until completion of overcharging is not the sum of both the value t1 and the value t12 but is one (e.g., t1=100 milliseconds) of both the values t1, t2.

Thus, according to the operations in the above-described embodiment, the period from the time of end of exposure to completion of the overcharging of the spring 88 (plainly, until the next shooting is enabled) can be shortened.

Besides, even in the case of opening the shutter curtain thereafter, it suffices to add the time required for opening the shutter (the time for transfer from the condition shown in FIG. 16 to the condition shown in FIG. 18) t3 (e.g., 30 milliseconds) (t3<t2). Therefore, it is also possible to shorten the period of time until the preparation for the next shooting is completed in the live view mode.

Particularly, in the live view mode, it is also possible to contrive power saving by maintaining the overcharged state of the spring 88 without energization of the electromagnet 95, and to shorten the period of time from the time of end of exposure until the overcharging of the spring 88 is again completed.

In addition, particularly when the above-mentioned operation is repeatedly carried out at the time of taking rapid succession shots, the period of time from the time when exposure relevant to a certain shot image is completed to the time when photographing of the next shot image is enabled can be shortened, thereby enhancing the rapid-succession-shots performance.

<7. Shutter Operation at the Time of Shooting Based on Optical Finder>

While the above description has been centered on the shutter operation concerning a shooting operation in a live view mode, this is not limitative of the shutter device 7. For example, the shutter device 7 as above can also be used for a shooting operation based on the optical finder.

Specifically, in the OVF mode, the condition upon transition from the condition STa (FIG. 15) immediately after end of exposure to the first set condition ST11 (FIG. 16) may be held, and a framing operation in the OVF mode may then be carried out. Besides, thereafter, sequential transition to each of the conditions shown respectively in FIGS. 17, 18 and 19 may be carried out at high speed, according to the depression of the release button 11.

Or, alternatively, a process may be adopted in which in the condition ST11 shown in FIG. 16, in response to depression of the release button 11, the electromagnet 95 is energized and the charging member 83 is immediately rotated counterclockwise, whereby direct transition to the condition STb shown in FIG. 19 is effected, without taking the course through the conditions shown in FIGS. 17 and 18.

Thereafter, the same operations as above may be carried out, whereby transition from the condition STb (FIG. 19) immediately before start of exposure to the condition STa (FIG. 15) immediately after end of exposure is effected, and, further, return to the first set condition ST11 (FIG. 16) is performed.

Particularly, in the image pickup apparatus 1 using the above-described shutter device 7, both a framing operation based on the live view and a framing operation based on the OVF can be realized. In the live-view-based framing operation, the condition where the spring 88 is overcharged and the trailing curtain is present in the aperture-opening position (the second set condition ST12) is used in the shutter device 7. This condition ST12 is maintained without energization of the electromagnet 95. In the OVF-based framing operation, on the other hand, the condition ST11 where the spring 88 is overcharged and the trailing curtain is present in the aperture-closing position is used in the shutter device 7. This condition ST11, also, is maintained without energization of the electromagnet 95. Thus, the conditions ST11 and ST12 are both realized without energization of the electromagnet 95. Therefore, power saving can be promised.

<8. Others>

While embodiments of the present invention have been described above, the invention is not to be limited to or by the contents of the above description.

For example, while the case where the driving member 81 and the driving member 82 are turned coaxially about the same axis AX1 has been shown as an example in the above embodiment, this is not limitative of the present invention. A configuration may be adopted in which the driving member 81 and the driving member 82 are turned about different axes, respectively.

The present application contains subject matter related to that disclosed in Japanese Priority Patent Application JP 2008-194454 filed in the Japan Patent Office on Jul. 29, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An image pickup apparatus comprising:
 an image sensor; and
 a shutter device disposed on the subject side of said image sensor, wherein
 said shutter device includes
  a trailing curtain operative to run from an exposure start position to an exposure end position to cover an exposure aperture,
  a first driving member operative to cause said trailing curtain to run from said exposure start position to said exposure end position,
  a second driving member operative to cause said trailing curtain to run from said exposure end position to said exposure start position,
  first urging force applying means by which a first urging force for moving said trailing curtain in a first direction from said exposure start position toward said exposure end position is applied to said first driving member, and
  a charging member which moves said first driving member in a predetermined direction so as to overcharge said first urging force applying means and thereby to increase said first urging force,
 said charging member
  moves said first driving member in said predetermined direction while restraining movement of said second driving member, so as to overcharge said first urging force applying means while maintaining a closed state of said aperture formed by said trailing curtain and thereby to transfer said shutter device into a first set condition, and, in said first set condition, makes contact with said first driving member to restrain movement of said first driving member, and
 said charging member
  in said closed state of said aperture formed by said trailing curtain, releases the restraint on movement of said second driving member to permit said second driving member to move, while moving said first driving member in said predetermined direction, so as to form an open state of said aperture by said trailing curtain while overcharging said first urging force applying means and thereby to transfer said shutter device into a second set condition, and, in said second set condition, makes contact with said first driving member to restrain movement of said first driving member.

2. The image pickup apparatus according to claim 1, wherein
 said shutter device further includes second urging force applying means by which a second urging force for moving said trailing curtain in a second direction opposite to said first direction is applied to said second driving member;
 said charging member, at the time of transition to said first set condition, is engaged with said second driving member so that movement of said second driving member by said second urging force is restrained and said trailing curtain is maintained at said exposure end position; and
 said charging member, at the time of transition to said second set condition, is disengaged from said second driving member while supporting said first driving member so that said second driving member is moved by said second urging force and said trailing curtain is moved to said exposure start position.

3. The image pickup apparatus according to claim 2, wherein
 said charging member is turned with a predetermined center axis as a center;
 at the time of transition to said first set condition, an engaging part of said charging member locks a circular arc-shaped projected part of said second driving member while moving along said circular arc-shaped projected part so that movement of said second driving member by said second urging force is restrained and said trailing curtain is maintained at said exposure end position; and
 said circular arc-shaped projected part is provided along an arc of a circle having a center on said predetermined center axis.

4. The image pickup apparatus according to claim 3, wherein at the time of transition to said second set condition, said charging member is rotated further by a predetermined angle from said first set condition with said predetermined center axis as a center, engagement between said engaging part and said circular arc-shaped projected part is released, and locking of said second driving member by said charging member is released, whereby said second driving member is moved by said second urging force and said trailing curtain is moved to said exposure start position.

5. The image pickup apparatus according to claim 1, further comprising
 display means for sequentially displaying time-series images pertaining to a subject image reaching said image sensor through said aperture, wherein
 said shutter device has said first set condition at the time of a framing operation conducted using an optical finder, and
 said shutter device has said second set condition at the time of a framing operation conducted using said time-series images displayed on said display means.

6. The image pickup apparatus according to claim 1, further comprising
 control means for controlling an operation of said shutter device, wherein
 said shutter device further includes an electromagnet capable of attracting said first driving member thereto and restraining movement of said first driving member, and
 said control means, in said second set condition, starts energization of said electromagnet to thereby attract said first driving member thereto and restraining movement of said first driving member, concurrently moves said charging member so as to release the support of said first driving member and to move said charging member to a predetermined retraction position, and thereafter stops energization of said electromagnet so that said first driving member is moved by said first urging force applied by said first urging force applying means and said second driving member is also moved, whereby said trailing curtain is caused to run from said exposure start position to said exposure end position.

7. The image pickup apparatus according to claim 6, further comprising
input means operative to accept a shooting command,
wherein said energization of said electromagnet is started in response to an input of said shooting command.

8. The image pickup apparatus according to claim 1, further comprising
reading control means for controlling a process of reading pixels in said image sensor,
wherein said reading control means carries out said reading process concurrently with an operation of overcharging by said first urging force applying means in the condition where the closed state of said aperture is maintained, in a period from the moment of end of exposure at said image sensor to the moment of end of transition to said first set condition.

9. A shutter device comprising:
a trailing curtain operative to run from an exposure start position to an exposure end position to cover an exposure aperture;
a first driving member operative to cause said trailing curtain to run from said exposure start position to said exposure end position;
a second driving member operative to cause said trailing curtain to run from said exposure end position to said exposure start position is applied to said first driving member;
first urging force applying means by which a first urging force for moving said trailing curtain in a first direction from said exposure start position toward said exposure end position; and
a charging member which moves said first driving member in a predetermined direction so as to overcharge said first urging force applying means and thereby to increase said first urging force, wherein
said charging member
moves said first driving member in said predetermined direction while restraining movement of said second driving member, so as to overcharge said first urging force applying means while maintaining a closed state of said aperture formed by said trailing curtain and thereby to transfer said shutter device into a first set condition, and, in said first set condition, makes contact with said first driving member to restrain movement of said first driving member, and
said charging member
in said closed state of said aperture formed by said trailing curtain, releases the restraint on movement of said second driving member to permit said second driving member to move, while moving said first driving member in said predetermined direction, so as to form an open state of said aperture by said trailing curtain while overcharging said first urging force applying means and thereby to transfer said shutter device into a second set condition, and, in said second set condition, makes contact with said first driving member to restrain movement of said first driving member.

10. An image pickup apparatus comprising:
an image sensor; and
a shutter device disposed on the subject side of said image sensor, wherein
said shutter device includes
a trailing curtain operative to run from an exposure start position to an exposure end position to cover an exposure aperture,
a first driving member to which a first urging force is applied by first urging force applying means and which causes said trailing curtain to run from said exposure start position to said exposure end position by said first urging force,
a second driving member which, on one hand, moves together with said first driving member so as to cause said trailing curtain to run from said exposure start position to said exposure end position and, on the other hand, moves independently of said first driving member so as to cause said trailing curtain to run from said exposure end position to said exposure start position, and
a charging member which moves said first driving member in a predetermined direction so as to overcharge said first urging force applying means and thereby to increase said first urging force,
said charging member
moves said first driving member in said predetermined direction while restraining movement of said second driving member, so as to overcharge said first urging force applying means while maintaining a closed state of said aperture formed by said trailing curtain and thereby to transfer said shutter device into a first set condition, and, in said first set condition, makes contact with said first driving member to restrain movement of said first driving member, and
said charging member
after transfer to said first set condition, releases the restraint on movement of said second driving member to permit said second driving member to move, maintains an overcharged state of said first urging force applying means, while forming an open state of said aperture by said trailing curtain, so as to transfer said shutter device into a second set condition, and, in said second set condition, makes contact with said first driving member to restrain movement of said first driving member.

11. A shutter device comprising:
a trailing curtain operative to run from an exposure start position to an exposure end position to cover an exposure aperture;
a first driving member to which a first urging force is applied by first urging force applying means and which causes said trailing curtain to run from said exposure start position to said exposure end position by said first urging force;
a second driving member which, on one hand, moves together with said first driving member so as to cause said trailing curtain to run from said exposure start position to said exposure end position and, on the other hand, moves independently of said first driving member so as to cause said trailing curtain to run from said exposure end position to said exposure start position; and
a charging member which moves said first driving member in a predetermined direction so as to overcharge said first urging force applying means and thereby to increase said first urging force, wherein said charging member
- moves said first driving member in said predetermined direction while restraining movement of said second driving member, so as to overcharge said first urging force applying means while maintaining a closed state of said aperture formed by said trailing curtain and thereby to transfer said shutter device into a first set condition, and, in said first set condition, makes contact with said first driving member to restrain movement of said first driving member, and said charging member
- after transfer to said first set condition, releases the restraint on movement of said second driving member to permit said second driving member to move, maintains an overcharged state of said first urging force applying means, while forming an open state of said aperture by said trailing curtain, so as to transfer said shutter device into a second set condition, and, in said second set condition, makes contact with said first driving member to restrain movement of said first driving member.

12. An image pickup apparatus comprising:
an image sensor; and
a shutter device disposed on the subject side of said image sensor, wherein
said shutter device includes
- a trailing curtain operative to run from an exposure start position to an exposure end position to cover an exposure aperture,
- a first driving member to which a first urging force is applied by first urging force applying means and which causes said trailing curtain to run from said exposure start position to said exposure end position by said first urging force,
- a second driving member which, on one hand, moves together with said first driving member so as to cause said trailing curtain to run from said exposure start position to said exposure end position and, on the other hand, moves independently of said first driving member so as to cause said trailing curtain to run from said exposure end position to said exposure start position, and
- a charging member which moves said first driving member in a predetermined direction so as to overcharge said first urging force applying means and thereby to increase said first urging force, said charging member
- moves said first driving member in said predetermined direction while restraining movement of said second driving member, so as to overcharge said first urging force applying means while maintaining a closed state of said aperture formed by said trailing curtain and thereby to transfer said shutter device into a first set condition, and said charging member
- after transfer to said first set condition, releases the restraint on movement of said second driving member to permit said second driving member to move, maintains an overcharged state of said first urging force applying means, while forming an open state of said aperture by said trailing curtain, so as to transfer said shutter device into a second set condition, and, in said second set condition, makes contact with said first driving member to restrain movement of said first driving member.

13. The image pickup apparatus according to claim 12, further comprising
reading control means for controlling a process of reading pixels in said image sensor,
wherein said reading control means carries out said reading process concurrently with an operation of overcharging by said first urging force applying means in the condition where the closed state of said aperture is maintained, in a period from the moment of end of exposure at said image sensor to the moment of end of transition to said first set condition.

14. The image pickup apparatus according to claim 13, further comprising
display means for sequentially displaying time-series images pertaining to a subject image reaching said image sensor through said aperture,
wherein said shutter device has said second set condition at the time of a framing operation conducted using said time-series images displayed on said display means.

15. A shutter device comprising:
- a trailing curtain operative to run from an exposure start position to an exposure end position to cover an exposure aperture;
- a first driving member to which a first urging force is applied by first urging force applying means and which causes said trailing curtain to run from said exposure start position to said exposure end position by said first urging force;
- a second driving member which, on one hand, moves together with said first driving member so as to cause said trailing curtain to run from said exposure start position to said exposure end position and, on the other hand, moves independently of said first driving member so as to cause said trailing curtain to run from said exposure end position to said exposure start position; and
- a charging member which moves said first driving member in a predetermined direction so as to overcharge said first urging force applying means and thereby to increase said first urging force, wherein said charging member
- moves said first driving member in said predetermined direction while restraining movement of said second driving member, so as to overcharge said first urging force applying means while maintaining a closed state of said aperture formed by said trailing curtain and thereby to transfer said shutter device into a first set condition, and said charging member
- after transfer to said first set condition, releases the restraint on movement of said second driving member to permit said second driving member to move, maintains an overcharged state of said first urging force applying means, while forming an open state of said aperture by said trailing curtain, so as to transfer said shutter device into a second set condition, and, in said second set condition, makes contact with said first driving member to restrain movement of said first driving member.

* * * * *